United States Patent
Li et al.

(10) Patent No.: US 12,506,173 B1
(45) Date of Patent: Dec. 23, 2025

(54) LITHIUM-ION SECONDARY BATTERY

(71) Applicant: ZHUHAI COSMX BATTERY CO., LTD., Zhuhai (CN)

(72) Inventors: Jiao Li, Zhuhai (CN); Jialin Fang, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/187,843

(22) Filed: Apr. 23, 2025

(30) Foreign Application Priority Data

Dec. 31, 2024 (CN) .......................... 202411995763.4

(51) Int. Cl.
| | |
|---|---|
| *H01M 10/0525* | (2010.01) |
| *H01M 4/131* | (2010.01) |
| *H01M 4/38* | (2006.01) |
| *H01M 4/525* | (2010.01) |
| *H01M 4/583* | (2010.01) |
| *H01M 10/04* | (2006.01) |
| *H01M 10/056* | (2010.01) |
| *H01M 50/449* | (2021.01) |
| *H01M 50/538* | (2021.01) |
| *H01M 4/02* | (2006.01) |

(52) U.S. Cl.
CPC ....... *H01M 10/0525* (2013.01); *H01M 4/131* (2013.01); *H01M 4/386* (2013.01); *H01M 4/525* (2013.01); *H01M 4/583* (2013.01); *H01M 10/0431* (2013.01); *H01M 10/056* (2013.01); *H01M 50/449* (2021.01); *H01M 50/538* (2021.01); *H01M 2004/021* (2013.01); *H01M 2004/027* (2013.01); *H01M 2004/028* (2013.01); *H01M 2300/0077* (2013.01)

(58) Field of Classification Search
None
See application file for complete search history.

(56) References Cited

U.S. PATENT DOCUMENTS

| | | | |
|---|---|---|---|
| 2023/0344082 A1* | 10/2023 | Cho ................... | H01M 50/489 |
| 2024/0047750 A1* | 2/2024 | Takami ............. | H01M 10/0525 |
| 2024/0297342 A1* | 9/2024 | Kamine ............. | H01M 50/489 |

FOREIGN PATENT DOCUMENTS

| | | |
|---|---|---|
| CN | 107331886 A | 11/2017 |
| JP | 2017-188404 A | 10/2017 |
| KR | 10-2024-0099081 A | 6/2024 |
| WO | 2024/228487 A1 | 11/2024 |

OTHER PUBLICATIONS

Notification to Grant Patent Right for Invention for Chinese Patent Application No. 202411995763.4, dated Sep. 29, 2025.

* cited by examiner

*Primary Examiner* — Wyatt P McConnell

(57) ABSTRACT

A lithium-ion secondary battery comprises a positive electrode plate, a negative electrode plate, the positive electrode active material comprises lithium cobaltate containing the element Al, and the mass content c1 of the element Al in the positive electrode active coating layer is 6800-15000 ppm; the negative electrode plate comprises a negative electrode active coating layer, and the negative electrode active coating layer comprises a silicon-carbon material, wherein the mass content c2 of the element Si in the negative electrode active coating layer is 1.5-20%. The battery of the present disclosure can have a high energy density, an excellent cycling stability, and a low-temperature discharge performance.

19 Claims, 5 Drawing Sheets

(a)

(b)

LITHIUM-ION SECONDARY BATTERY

CROSS-REFERENCE TO RELATED APPLICATIONS

This application claims priority to Chinese Patent Application No. 202411995763.4, filed on Dec. 31, 2024, which is hereby incorporated by reference in its entirety.

TECHNICAL FIELD

The present disclosure relates to the technical field of batteries, in particular to a lithium-ion secondary battery.

BACKGROUND

A high capacity is a constant pursuit for batteries by the user. Improving the battery capacity is nothing more than improving the gram capacities of the positive and negative electrode materials. The gram capacity of the negative electrode material is improved by doping with silicon, and the gram capacity of the positive electrode material is improved by increasing the charge cut-off voltage. However, under a high voltage, the lattice structure of the positive electrode material collapses as the process of the charging and discharging of the battery runs, resulting in poor cycling stability of the battery. Moreover, due to the relatively poor conductivity of the silicon material itself, when the negative electrode plate is doped with silicon, especially when the silicon content in the negative electrode plate is relatively high (for example, when the mass content of the element silicon in the negative electrode active coating layer is greater than or equal to 5%), the low-temperature discharge performance of the battery is significantly reduced.

Therefore, there is a need to improve both the cycling stability and low-temperature discharge performance of a high-energy-density battery.

SUMMARY

An object of the present disclosure is to provide a lithium-ion secondary battery in order to overcome the problems of a relatively poor cycling stability and low-temperature discharge performance of high-energy-density batteries in the prior art. By using a silicon-carbon material as a negative electrode active material and lithium cobaltate as a positive electrode active material and combining a higher charge cut-off voltage (for example, ≥4.5 V), the lithium-ion secondary battery (hereinafter referred to as battery) of the present disclosure can achieve a high energy density. In addition, the lattice structure of lithium cobaltate can be stabilized by adjusting the content of the element Al in lithium cobaltate, thus improving the cycling stability of the battery. Moreover, in view of the problem of a relatively poor low-temperature discharge performance of batteries with a high doping amount of silicon (for example, when the mass content of the element silicon in the negative electrode active coating layer is greater than or equal to 5%), the low-temperature discharge performance of batteries is improved by adding a solid electrolyte to the positive electrode plate and adding a specific solvent to the electrolyte solution.

The present disclosure provides a lithium-ion secondary battery. The lithium-ion secondary battery comprises a positive electrode plate, a negative electrode plate, and an electrolyte solution and has a charge cut-off voltage ≥4.5 V, wherein the positive electrode plate comprises a positive electrode active coating layer comprising a positive electrode active material and a solid electrolyte, wherein the positive electrode active material comprises lithium cobaltate containing the element Al, and the mass content $c_1$ of the element Al in the positive electrode active coating layer is 6800-15000 ppm; and the solid electrolyte comprises at least one of lithium aluminum titanium phosphorus oxide, lithium lanthanum zirconium tantalum oxide, and lithium lanthanum titanium oxide; the negative electrode plate comprises a negative electrode active coating layer, and the negative electrode active coating layer comprises a negative electrode active material comprising a silicon-carbon material, wherein the mass content $c_2$ of the element Si in the negative electrode active coating layer is 1.5-20%; and the electrolyte solution comprises a solvent comprising a carboxylate compound.

With the increase of the upper limit of the charging voltage of the battery, the potential on the positive electrode side also becomes higher and higher, and thus, the challenge to the stability of the lattice structure of lithium cobaltate becomes greater. On the one hand, the element Al is capable of forming an Al—O bond, which has a relatively large bond energy, with the element O in lithium cobaltate, thus effectively suppressing the lattice oxygen from escaping; on the other hand, $Al^{3+}$ is more stable in the octahedral structure of lithium cobaltate, which makes it more difficult for lithium cobaltate to transform into a monoclinic system, thus reducing the kinetics of the formation of the monoclinic system and inhibiting the phase transition of lithium cobaltate. Therefore, the effect of stabilizing lithium cobaltate can be achieved by adjusting the mass content of the element Al in the positive electrode active coating layer. However, it does not mean that the greater the content of the element Al, the better. This is because when the content of the element Al increases, the gram capacity of lithium cobaltate decreases, which will affect the overall energy density of the battery. Therefore, it is necessary to adjust the mass content of the element Al in the positive electrode active coating layer, such that when a specific range is met, stable operation of the positive electrode plate under a high voltage (e.g., 4.5 V or higher) can be ensured, and sufficient capacity utilization of the positive electrode plate is ensured, while loss in energy density caused by an excessively high mass content of the element Al is avoided.

The conductivity of the silicon-carbon materials is relatively poor, and with the decrease of the temperature, the ionic conductivity of the electrolyte solution decreases significantly. Silicon-doped systems, especially those with a high doping amount of silicon (for example, the mass content of the element silicon in the negative electrode active coating layer is greater than or equal to 5%), are faced with the problem of discharge failure in extreme weathers at low temperatures (for example, the temperature is −20° C. or lower). The ionic conductivity of the solid electrolyte decreases insignificantly with the decrease of the temperature. The addition of the solid electrolyte to the positive electrode plate allows ions to be conducted along the solid electrolyte at extremely low temperature conditions, thus replacing the conduction path of part of the electrolyte solution and ensuring that the battery can discharge normally under low-temperature conditions. In addition, since the discharge process is a process of lithium deintercalation at the negative electrode and lithium intercalation at the positive electrode, it is necessary to increase the lithium intercalation rate at the positive electrode side in order to improve the low-temperature discharge performance of the battery; therefore, the solid electrolyte is added to the positive electrode plate.

By means of the above solution, the cycling stability of the battery can be improved, and the low-temperature discharge performance of the battery can be improved to a certain extent; however, the improvement in the low-temperature discharge performance is not as expected. Therefore, there is a need to further improve the low-temperature discharge performance of the battery. Compared with a carbonate compound, a carboxylate compound has a lower melting point and viscosity, which means that the carboxylate compound can maintain a liquid state more easily at low temperatures, thus maintaining the conductivity and discharge performance of the battery. Moreover, carboxylate compounds contribute to the formation of a stable and dense SEI (Solid Electrolyte Interphase) film with a relatively low impedance, which is crucial for the low-temperature discharge performance of a battery. Therefore, by adding a carboxylate compound to the electrolyte solution, the electrochemical properties of the electrolyte solution can be improved, the solvation structure of lithium ions can be optimized to form a stable SEI layer, thus significantly improving the low-temperature discharge performance of the battery.

By means of the above technical solution, the present disclosure has at least the following advantages over the prior art: the battery of the present disclosure can have a high energy density, an excellent cycling stability, and a low-temperature discharge performance.

The endpoints of ranges and any values disclosed herein are not limited to such exact ranges or values, and these ranges or values should be understood to include values close to these ranges or values. For numerical value ranges, one or more new numerical value ranges can be obtained between endpoint values of various ranges, between endpoint values of various ranges and individual point values, and between individual point values, and these numerical value ranges should be regarded as specifically disclosed herein.

BRIEF DESCRIPTION OF THE DRAWINGS

FIG. 3 is a schematic view showing the spacing of grooves in an example of the present disclosure, wherein FIG. 3(a) shows the case where two adjacent long sides are straight and parallel, FIG. 3(b) shows the case where two adjacent long sides are straight and non-parallel, and FIG. 3(c) shows the case where two adjacent long sides are curved.

FIG. 5 is a schematic view showing the structure of a positive electrode plate in an example of the present disclosure, wherein FIG. 5(a) is a top view, and FIG. 5(b) is a cross-sectional view along the thickness direction.

DETAILED DESCRIPTION OF EMBODIMENTS

Figure 1:
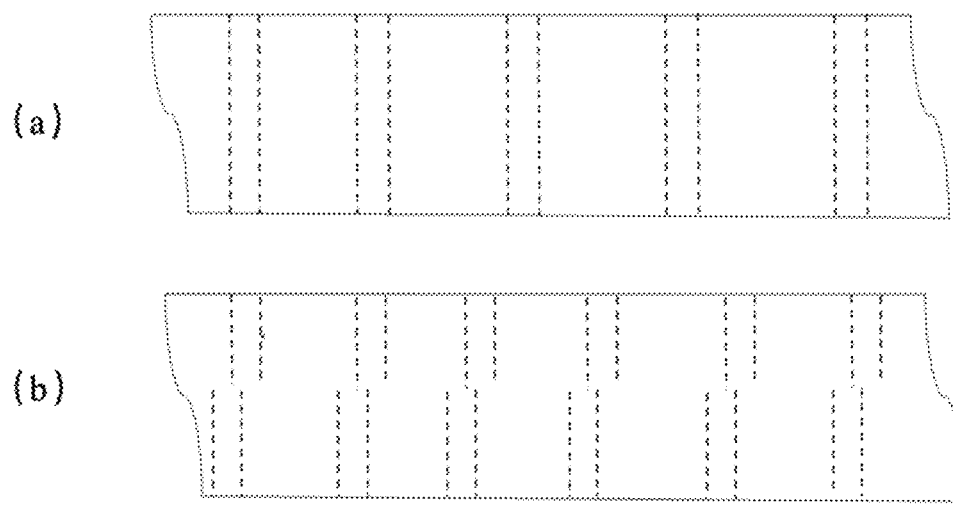
FIG. 1 is a schematic view (top view) showing grooves on a surface of a negative electrode plate in an example of the present disclosure, wherein in FIG. 1(a), the grooves are arranged continuously; and in FIG. 1(b), the grooves are arranged in segments.

Hereinafter, specific embodiments of the present disclosure will be described in detail. It should be understood that the specific embodiments described herein are only used to illustrate and explain the present disclosure and are not used to limit the present disclosure.

The present disclosure provides a lithium-ion secondary battery. The lithium-ion secondary battery can comprise a positive electrode plate, a negative electrode plate, and an electrolyte solution. The lithium-ion secondary battery has a charge cut-off voltage ≥4.5 V, e.g., 4.5 V or 4.53 V. The term charge cut-off voltage has the conventional meaning in the art and generally refers to the maximum voltage that a battery can safely reach during charging.

In the present disclosure, the positive electrode plate can comprise a positive electrode active coating layer. The positive electrode active coating layer can comprise a positive electrode active material and a solid electrolyte. The positive electrode active material can comprise lithium cobaltate. The lithium cobaltate comprises the element Al, wherein the mass content c1 of the element Al in the positive electrode active coating layer can be 6800-15000 ppm, e.g., 6800 ppm, 7000 ppm, 8000 ppm, 9000 ppm, 10000 ppm, 11000 ppm, 12000 ppm, 13000 ppm, 14000 ppm, or 15000 ppm.

In one example, c1 is 7100-10000 ppm.

In the present disclosure, the mass content c1 of the element Al in the positive electrode active coating layer can be determined by testing with a conventional method in the art, e.g., by using an inductively coupled plasma-optical emission spectrometer (ICP-OES), and the specific test method is as follows: after a battery is discharged to 0% SOC, a positive electrode plate is disassembled, taken out and soaked in dimethyl carbonate (DMC) solvent for 12 h; and the positive electrode plate is then rinsed with the solvent DMC to remove a lithium salt adhered thereto and calcined in a muffle furnace at 400° C. for 3 h, the positive electrode active coating layer is then gently scraped off the surface of the positive electrode current collector, and the mass content (in ppm, i.e., parts per million) of the element Al is measured by ICP-OES. The specific operation method is carried out according to GB/T 30902-2014.

In the present disclosure, the chemical formula of lithium cobaltate can be $Li_aCo_bM^1_cO_2$, in which $0.8 \leq a \leq 1.05$, $0.85 \leq b < 1$, $0 < c \leq 0.15$, and $M^1$ includes at least one of Al, Mg, Ti, Y, La, Ga, Ge, Sn, Si, Zr, Ca, Sb, In, Ni, and Mn. The lithium cobaltate can comprise first particles and second particles, wherein the average particle size of the first particles can be 0.3-7 μm (e.g., 0.3 μm, 0.5 μm, 1 μm, 2 μm, 3 μm, 4 μm, 5 μm, 6 μm, or 7 μm), and the average particle size of the second particles can be 7.5-40 μm (e.g., 7.5 μm, 10 μm, 15 μm, 20 μm, 25 μm, 30 μm, 35 μm, or 40 μm). In the case of using the lithium cobaltate of the first particles and second particles with different average particle sizes, the difference of particle size distribution therebetween can directly affect the filling effect of lithium cobaltate powder in the process of compression, which in turn affects the compaction density and electron conductivity of the lithium cobaltate, thus facilitating the improvement of the overall energy density and fast charging capability of the battery.

In the present disclosure, the average particle size of the first particles and the average particle size of the second particles can be determined by testing with a conventional method in the art. For example, after a battery is discharged to 0% SOC, a positive electrode plate is disassembled, taken out and soaked in the solvent DMC for 12 h; the positive electrode plate is then rinsed with the solvent DMC to remove a lithium salt adhered thereto and calcined in a muffle furnace at 400° C. for 3 h; and the positive electrode active coating layer is gently scraped off the surface of the positive electrode current collector and tested using a laser particle analyzer, and the particle size ranges of the first particles and the second particles can be derived from the resulting curves.

In the present disclosure, the solid electrolyte can comprise at least one of lithium aluminum titanium phosphorus oxide, lithium lanthanum zirconium tantalum oxide, and lithium lanthanum titanium oxide. The lithium aluminum titanium phosphorus oxide can be superionic conductor-type lithium aluminum titanium phosphorus oxide having a molecular formula of $Li_{1+x}Al_xTi_{2-x}(PO_4)_3$, with $0<x\leq0.5$. The lithium lanthanum zirconium tantalum oxide can be garnet-type lithium lanthanum zirconium tantalum oxide having a molecular formula of $Li_{7-y}La_3Zr_{2-y}Ta_yO_{12}$, with $0\leq y\leq0.5$. The lithium lanthanum titanium oxide can be perovskite-type lithium lanthanum titanium oxide having a molecular formula of $Li_{3z}La_{2/3-z}TiO_3$, with $0<z\leq0.2$. A solid electrolyte satisfying the above molecular formula has a relatively strong ionic conductivity, a relatively high dielectric coefficient, and a good affinity for the electrolyte solution; When used for a positive electrode plate, the solid electrolyte can improve the ion transport capacity of the positive electrode plate and improve the dynamics of the battery, so that the battery has a high energy density, a good low-temperature discharge performance and cycling stability.

In the present disclosure, the negative electrode plate can comprise a negative electrode active coating layer. The negative electrode active coating layer can comprise a negative electrode active material, and the negative electrode active material can comprise a silicon-carbon material. The silicon-carbon material refers to a composite material comprising the element carbon and the element silicon, including, for example, a material formed by filling (including partially filling or completely filling) pores of porous carbon with silicon and/or oxidized silicon.

In the present disclosure, the mass content c2 of the element Si in the negative electrode active coating layer can be 1.5-20%, e.g., 1.5%, 2%, 3%, 4%, 5%, 6%, 7%, 8%, 9%, 10%, 11%, 12%, 13%, 14%, 15%, 16%, 17%, 18%, 19%, or 20%.

In one example, c2 is 4-12%.

In the present disclosure, the mass content c2 of the element Si in the negative electrode active coating layer can be determined by testing with a conventional method in the art. For example, after a battery is discharged to 0% SOC, a negative electrode plate is disassembled, taken out and soaked in the solvent DMC for 12 h; the negative electrode plate is then rinsed with the solvent DMC to remove a lithium salt adhered thereto and dried in the air, and the negative electrode plate is then treated at a high temperature of 400° C. in an inert atmosphere for 2 h (for example, in a tube furnace in a nitrogen or argon atmosphere); and the negative electrode active coating layer can thus be gently scraped off the negative electrode current collector, and the negative electrode active coating layer is collected as a test sample. Using a thermogravimetric analyzer (e.g., TGA 550 thermogravimetric analyzer), an amount of 5-15 mg of the test sample is heated from room temperature (25° C.) to 900° C. at a ramp rate of 10° C./min in an air or oxygen atmosphere and maintained at 900° C. for 40 min, so that silicon can be fully oxidized into silicon dioxide while the non-silicon components in the negative electrode active coating layer can be volatilized. The residual substance is namely the ash of the negative electrode active coating layer. The mass content of the element Si in the negative electrode active coating layer can be calculated based on the mass of the ash, and the calculation formula is as follows: the mass content of the element Si in the negative electrode active coating layer=7×the mass of the ash/(15×the mass of the test sample).

In the present disclosure, the mass content of the element Si in the silicon-carbon material can be 30-80%, e.g., 30%, 35%, 40%, 45%, 50%, 55%, 60%, 65%, 70%, 75%, or 80%.

In the present disclosure, the electrolyte solution can comprise a solvent. The solvent can comprise a carboxylate compound. The carboxylate compound comprises, for example, at least one of the following solvents which are substituted with fluorine or unsubstituted: ethyl acetate, propyl acetate, n-butyl acetate, isobutyl acetate, n-amyl acetate, isoamyl acetate, methyl propionate (PP), ethyl propionate, propyl propionate, methyl butyrate, ethyl butyrate, and ethyl n-butyrate.

In the present disclosure, the mass content of the carboxylate compound in the electrolyte solution can be 10-80%, e.g., 10%, 15%, 20%, 25%, 30%, 35%, 40%, 45%, 50%, 55%, 60%, 65%, 70%, 75%, or 80%.

In one example, the mass content of the carboxylate compound in the electrolyte solution is 20-65%.

In the present disclosure, the mass content of the carboxylate compound in the electrolyte solution can be determined by testing with a conventional method in the art. For example, after a battery is discharged to 0% SOC, the electrolyte solution in the battery is extracted and tested by gas chromatography (GC) to obtain the mass content thereof.

In the present disclosure, the solid electrolyte comprises a characteristic element. The characteristic element includes at least one of Ti, Zr, La, and Ta. The ratio of the mass content c3 of the characteristic element in the positive electrode active coating layer to the mass content c4 of the element Co in the positive electrode active coating layer can be 0.001-0.0055, e.g., 0.001, 0.0015, 0.002, 0.0025, 0.003, 0.0035, 0.004, 0.0045, 0.005, or 0.0055.

In one example, the ratio of the mass content c3 of the characteristic element in the positive electrode active coating layer to the mass content c4 of the element Co in the positive electrode active coating layer is 0.0015-0.0035.

By adjusting the ratio of the mass content of the characteristic element to that of the element Co in the positive electrode active coating layer, the battery can have both low-temperature discharge performance and high-temperature stability. This is because the ratio of the two can indicate the mass ratio of the solid electrolyte to the lithium cobaltate in the positive electrode active coating layer. When the ratio of the two is relatively small (e.g., less than 0.001), the mass content of the solid electrolyte in the positive electrode active coating layer is relatively low; thus, the effect of the solid electrolyte on the improvement of the low-temperature discharge performance of the battery is limited. In contrast, when the ratio of the two is relatively large (e.g., more than 0.0055), the mass content of the solid electrolyte in the positive electrode active coating layer is relatively high, and since the solid electrolyte is unstable in a high temperature environment, gas generation easily occurs. Therefore, when the content thereof is relatively high, the high-temperature performance of the battery will be adversely affected.

In the present disclosure, the mass content $c_3$ of the characteristic element in the positive electrode active coating layer can be 600-3000 ppm, e.g., 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2500 ppm, or 3000 ppm.

In one example, $c_3$ is 900-2000 ppm.

In the present disclosure, the mass content $c_3$ of the characteristic element in the positive electrode active coating layer can be determined by testing with a conventional method in the art, e.g., by ICP-OES. The specific test method is as follows: after a battery is discharged to 0% SOC, a positive electrode plate is disassembled, taken out and soaked in the solvent DMC for 12 h; and the positive electrode plate is then rinsed with the solvent DMC to remove a lithium salt adhered thereto and calcined in a muffle furnace at 400° C. for 3 h, the positive electrode active coating layer is then gently scraped off the surface of the positive electrode current collector, and the mass content (in ppm, i.e., parts per million) of the characteristic element is measured by ICP-OES. The specific operation method is carried out according to GB/T 30902-2014.

In the present disclosure, "the mass content $c_3$ of the characteristic element in the positive electrode active coating layer" refers to the mass content of at least one characteristic element of the solid electrolyte in the positive electrode active coating layer. For example, when the solid electrolyte is lithium lanthanum zirconium tantalum oxide, the lithium lanthanum zirconium tantalum oxide comprises three characteristic elements, La, Zr, and Ta, and the mass content of at least one of the element La, the element Zr, or the element Ta in the positive electrode active coating layer satisfies the above $c_3$.

In the present disclosure, the mass content $c_4$ of the element Co in the positive electrode active coating layer can be 400000-750000 ppm, e.g., 400000 ppm, 450000 ppm, 500000 ppm, 550000 ppm, 600000 ppm, 650000 ppm, 700000 ppm, or 750000 ppm.

In one example, $c_4$ is 500000-650000 ppm.

In the present disclosure, the average particle size of the solid electrolyte can be 500 nm-3 μm, e.g., 500 nm, 600 nm, 700 nm, 800 nm, 900 nm, 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, or 3 μm.

In one example, the average particle size of the solid electrolyte is 1-2 μm.

In the present disclosure, the average particle size of the solid electrolyte can be determined by testing with a conventional method in the art. For example, after a battery is discharged to 0% SOC, a positive electrode plate is disassembled, taken out and soaked in the solvent DMC for 12 h, the positive electrode plate is then rinsed with the solvent DMC to remove a lithium salt adhered thereto; the positive electrode plate is cut by argon ion grinder CP laser, then observed by SEM, and measured at a magnification of 5K; and at least 20 solid electrolyte particles are randomly selected to measure the particle size of each solid electrolyte particle, and the average value is taken. If the number of solid electrolyte particles is less than 20 at the magnification of 5K, another microscope image is taken until the 20 solid electrolyte particles are measured.

In the present disclosure, the electrolyte solution can further comprise vinylene carbonate (VC). VC is an unsaturated additive with good film-forming properties, which can undergo reduction and decomposition at the negative electrode to participate in the formation of an SEI film in the formation stage of the battery (therefore, the content of VC in the electrolyte solution, as obtained by testing after the battery leaves the factory, is significantly lower than the content of VC during the preparation of the battery), which plays a role in protecting the interface stability between the silicon-carbon material and the electrolyte solution. The SEI film derived from the reduction and decomposition of VC is rich in some highly elastic polymers, so it can help to suppress the volume expansion of the silicon-carbon material during cycling and ensures the efficient migration of lithium ions in the SEI film while improving the cycling stability, thus improving the low-temperature discharge performance of the battery.

In the present disclosure, the mass content $c_5$ of vinylene carbonate in the electrolyte solution can be 0.01-15%, e.g., 0.01%, 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, or 15%.

In the present disclosure, the mass content $c_5$ of vinylene carbonate in the electrolyte solution can be determined by testing with a conventional method in the art. For example, after the battery is discharged to 0% SOC, the electrolyte solution in the battery is extracted and tested by GC.

In the present disclosure, the mass content $c_3$ of the characteristic element in the positive electrode active coating layer and the mass content $c_1$ of the element Al in the positive electrode active coating layer satisfy: $5\times10^{-6} \leq c_3 \times c_1 \leq 2.5\times10^{-5}$, e.g., $5\times10^{-6}$, $6\times10^{-6}$, $7\times10^{-6}$, $8\times10^{-6}$, $9\times10^{-6}$, $1\times10^{-5}$, $1.5\times10^{-5}$, $2\times10^{-5}$, or $2.5\times10^{-5}$.

In one example, $9.3\times10^{-6} \leq c_3 \times c_1 \leq 1.5\times10^{-5}$.

The mass content of the element Al in the positive electrode active coating layer affects the gram capacity of the positive electrode active material, and the low-temperature discharge capacity of the battery decreases with the increase of the mass content of the element Al. In addition, the content of the characteristic element directly affects the low-temperature discharge performance of the battery, and the low-temperature discharge capacity of the battery will increase with the increase of the content of the characteristic element to a certain extent. Therefore, when the two satisfy a specific relationship, the battery has a relatively high low-temperature discharge capacity, and the reduction in high-temperature performance due to excessive solid electrolyte will not occur.

In the present disclosure, the silicon-carbon material can comprise primary spherical particles. The average particle size of the primary spherical particles can be 1-6 μm, e.g., 1 μm, 2 μm, 3 μm, 4 μm, 5 μm, or 6 μm.

In one example, the average particle size of the primary spherical particles is 3-5 μm.

In the present disclosure, the average particle size of the primary spherical particles can be determined by testing with a conventional method in the art. For example, after a battery is discharged to 0% SOC, a negative electrode plate is disassembled, taken out and soaked in the solvent DMC for 12 h; the negative electrode plate is then rinsed with the solvent DMC to remove a lithium salt adhered thereto and cut by argon ion grinder CP laser and then observed by SEM (using a high-voltage mode (Back-scattered Electrons BSE)), wherein in this mode, the contrast of the silicon-carbon material is bright (which can be used to distinguish the graphite material and the conductive agent in the negative electrode active coating layer); and after measurement at a magnification of 5K, at least 20 primary spherical particles are randomly selected to measure the particle size of each primary spherical particle, and the average value is taken. If the number of primary spherical particles is less than 20 at the magnification of 5K, another microscope image is taken until the 20 primary spherical particles are measured.

Conventionally used silicon-carbon materials are blocky, and the average particle size is about 6-12 μm. A relatively large average particle size leads to a relatively poor conductivity of the particles. In addition, since the hardness of the silicon-carbon material is relatively large, the compaction density thereof is relatively small, which makes it difficult for the silicon content in the negative electrode active coating layer to reach 5% or more, that is, the improvement of the energy density of the battery is limited. Using the silicon-carbon material of primary spherical particles with an average particle size of 1-6 μm not only leads to a relatively high silicon content, i.e., a silicon content up to 1.5-20% in the negative electrode active coating layer, but can also significantly improve the energy density of the battery; moreover, the particle size thereof is relatively small, which can improve the overall conductivity of the negative electrode plate, thus improving the low-temperature discharge performance of the battery.

In the present disclosure, the silicon-carbon material further comprises secondary spherical particles formed from a plurality of the primary spherical particles. The term "plurality of" means that the number of the primary spherical particles forming the secondary spherical particles is greater than or equal to 2.

Primary spherical particles with a relatively small particle size are beneficial to improve the energy density of the battery; However, due to the relatively small particle size thereof, the specific surface area is relatively large, so that the risk of side reactions with the electrolyte solution is correspondingly increased, leading to a relatively poor stability. In order to reduce the side reactions between the silicon-carbon material and the electrolyte solution, the secondary spherical particles formed from a plurality of the primary spherical particles are further added. The secondary spherical particles with a relatively large particle size have a relatively small specific surface area, so the risk of side reactions with the electrolyte solution is relatively low, leading to a relatively good stability.

In the present disclosure, the average particle size of the secondary spherical particles can be 3-20 μm, e.g., 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm.

In the present disclosure, the average particle size of the secondary spherical particles can be determined by testing with a conventional method in the art. For example, after a battery is discharged to 0% SOC, a negative electrode plate is disassembled, taken out and soaked in the solvent DMC for 12 h; the negative electrode plate is then rinsed with DMC to remove a lithium salt adhered thereto and cut by argon ion grinder CP laser and then observed by SEM (using a high-voltage mode); and after measurement at a magnification of 5K, at least 20 secondary spherical particles are randomly selected to measure the particle size of each secondary spherical particle, and the average value is taken. If the number of secondary spherical particles is less than 20 at the magnification of 5K, another microscope image is taken until the 20 secondary spherical particles are measured.

In the present disclosure, the proportion of the number of the primary spherical particles in the negative electrode active coating layer relative to the total number of the primary spherical particles and the secondary spherical particles is 0.1-0.9, e.g., 0.1, 0.2, 0.3, 0.4, 0.5, 0.6, 0.7, 0.8, or 0.9.

In one example, the proportion of the number of the primary spherical particles in the negative electrode active coating layer relative to the total number of the primary spherical particles and the secondary spherical particles is 0.3-0.8.

In the present disclosure, the number of the primary spherical particles and the number of the secondary spherical particles in the negative electrode active coating layer can be determined by testing with a conventional method in the art. For example, after a battery is discharged to 0% SOC, a negative electrode plate is disassembled, taken out and soaked in the solvent DMC for 12 h; the negative electrode plate is then rinsed with the solvent DMC to remove a lithium salt adhered thereto and cut along the thickness direction of the negative electrode plate by argon ion grinder CP laser and then observed by SEM (using a high-voltage mode) to obtain a microscope image of the cross section of the negative electrode plate along the thickness direction; after observation at a magnification of 1K, at least 20 microscope images of different cross sections are selected, the number of the primary spherical particles and the number of the secondary spherical particles in each microscope image are counted separately, and the average value is taken.

In the present disclosure, the negative electrode active material can further comprise a graphite material. The graphite material includes, for example, artificial graphite and/or natural graphite. The graphite material comprises secondary particles. The secondary particles are formed from a plurality of primary particles. The term "plurality of" means that the number of the primary particles forming the secondary particles is greater than or equal to 2.

In the present disclosure, the average particle size of the secondary particles can be 6-20 μm, e.g., 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm.

By using a specific graphite material in combination and adjusting the structure and particle size of the graphite material, the graphite material comprises secondary particles composed of primary particles, and the average particle size of the secondary particle is 6-20 μm, so that the energy density of the battery can be further improved. Compared with a graphite material of primary particles, secondary particles of the graphite material with a specific particle size can improve the energy density of the battery. Therefore, the graphite material has a relatively high matching degree with the specific silicon-carbon material, which is beneficial to the improvement of the energy density of the battery.

In the present disclosure, the average particle size of the secondary particles can be determined by testing with a conventional method in the art. For example, after a battery is discharged to 0% SOC, a negative electrode plate is disassembled, taken out and soaked in the solvent DMC for 12 h; the negative electrode plate is then rinsed with the solvent DMC to remove a lithium salt adhered thereto, and the negative electrode active coating layer is then washed off a negative electrode current collector with deionized water, and after an ultrasonic treatment and centrifugation to remove the filtrate, the remaining material is dried in the air; and the obtained sample is dispersed in deionized water containing nonylphenol polyoxyethylene ether (in which the mass content of nonylphenol polyoxyethylene ether is 0.02-0.03%) to form a mixture, and after an ultrasonic treatment for 2 minutes, the sample is tested by Malvern particle size tester to obtain median particle size Dv50 data, namely the average particle size of secondary particles. Due to the specific composition and particle size of the graphite material and silicon-carbon material in the present disclosure, the silicon-carbon material has little influence on the average particle size of the secondary particles of the graphite material, and therefore, the data obtained by using the above test method is namely the average particle size of the secondary particles.

In the present disclosure, the lithium-ion secondary battery can further comprise a separator. The separator can comprise an organic coating layer, and the organic coating layer comprises polymer particles containing at least one of cyano, isocyano, isocyanate group, and triazinyl. The polymer particles comprise, for example, at least one of polyacrylonitrile, nitrile butadiene rubber, 1,3,5-triazine-2,4,6-triamine, cyanuric acid, melamine, and melamine trithiocyanurate.

In one example, the organic coating layer faces the positive electrode plate.

When the organic coating layer directly faces the positive electrode plate, an organic cyanide in the organic coating layer can diffuse to the surface of the positive electrode plate and serve to stabilize the metal ions and the crystal structure of the positive electrode active material and reduce the release of active oxygen, which is beneficial to improving the stability of the positive electrode active material, thus improving the cycling stability of the battery.

In the present disclosure, the mass content of the element N in the organic coating layer can be 10.5-55%, e.g., 10.5%, 15%, 20%, 25%, 30%, 35%, 40%, 45%, 50%, or 55%.

In one example, the mass content of the element N in the organic coating layer is 15-35%.

In the present disclosure, the mass content of the element N in the organic coating layer can be determined by testing with a conventional method in the art. For example, after a battery is discharged to 0% SOC, a separator is disassembled, taken out and soaked in the solvent DMC for 12 h; the separator is then rinsed with the solvent DMC to remove a lithium salt adhered thereto, and an adhesive layer on the outer surface of the organic coating layer is gently removed with an adhesive tape (this step is omitted if there is no adhesive layer on the outer surface of the organic coating layer); the organic coating layer is observed by SEM; and then by means of an energy dispersive spectrometer (EDS), the particles in the organic coating layer are scanned point by point at a magnification of 30K, at least 20 points are selected to test the mass content of the element nitrogen, and the average value is taken.

In the present disclosure, the separator can further comprise a substrate layer and/or an adhesive layer. The substrate layer comprises polyethylene, for example. The adhesive layer comprises polyvinylidene fluoride (PVDF) and/or polymethyl methacrylate (PMMA), for example.

In one example, the separator comprises the substrate layer, the organic coating layer located on the surface on one side of the substrate layer, and the adhesive layer located on the surface on the other side of the substrate layer.

In one example, the separator comprises the substrate layer, the organic coating layer located on the surface on one side of the substrate layer, and the adhesive layer located on outer surfaces on both sides of the separator.

In the present disclosure, the thickness h of the organic coating layer can be 0.5-4 µm, e.g., 0.5 µm, 1 µm, 2 µm, 3 µm, or 4 µm.

In one example, h is 1-2 µm.

In the present disclosure, an outer surface of the negative electrode active coating layer can have first recesses. The negative electrode plate comprises a negative electrode current collector and the negative electrode active coating layer located on a surface on at least one side of the negative electrode current collector. The outer surface of the negative electrode active coating layer refers to the surface of the negative electrode active coating layer facing away from the negative electrode current collector.

The outer surface of the negative electrode active coating layer is provided with first recesses. The first recesses can provide a certain release space for the volume expansion of the negative electrode active material and can reduce the extension of the negative electrode current collector caused by the volume expansion of the negative electrode active material, thereby facilitating further improvement of the cycling stability of the battery.

In the present disclosure, the first recesses can comprise either recessed holes or grooves. The first recesses can be achieved by laser drilling or scribing technology. When the first recesses are grooves, the grooves can be arranged either continuously or in segments. FIG. 1 is a schematic view (top view) showing grooves on a surface of a negative electrode plate in an example of the present disclosure, wherein in FIG. 1(a), the grooves are arranged continuously; and in FIG. 1(b), the grooves are arranged in segments. As can be seen from the figure, the surface of the negative electrode plate (i.e., the surface of the negative electrode active coating layer) has a plurality of grooves. In FIG. 1(a), the grooves are arranged continuously in the width direction of the negative electrode plate, and in FIG. 1(b), the grooves are arranged in segments in the width direction of the negative electrode plate. It will be appreciated that FIG. 1 only shows the case where the grooves are arranged in the width direction of the negative electrode plate; however, the grooves can also be arranged in the length direction of the negative electrode plate.

In the present disclosure, the depth of the first recesses can be 5-40 µm, e.g., 5 µm, 10 µm, 15 µm, 20 µm, 25 µm, 30 µm, 35 µm, or 40 µm. The depth of the first recesses has the conventional meaning in the art and refers to the perpendicular distance from the lowest point in the first recesses to the surface of the negative electrode plate. The depth of the first recesses can be measured by testing with a conventional method in the art. For example, the depths of all the first recesses or at least 20 first recesses on the surface of the negative electrode active coating layer are measured by a 3D profile meter, and the average value is taken.

In one example, the depth of the first recesses is 15-30 µm.

In the present disclosure, the width of the first recesses can be 40-200 µm, e.g., 40 µm, 50 µm, 60 µm, 70 µm, 80 µm, 90 µm, 100 µm, 150 µm, or 200 µm.

In one example, the width of the first recesses is 60-100 µm.

When the first recesses are recessed holes, the width of the first recesses refers to the hole diameter of the recessed holes. The hole diameter of the recessed holes has the conventional meaning in the art. When the shape of the orthographic projection of the recessed holes on the surface of the negative electrode plate is a "regular circle", the hole diameter of the recessed holes is the diameter of the regular circle; and when the shape of the orthographic projection of the recessed holes on the surface of the negative electrode plate is an "irregular circle" (e.g., an ellipse or an irregular curve polygon), the hole diameter of the recessed holes is the diameter of an equivalent circle with an area equal to that of the "irregular circle". The hole diameter of the recessed holes can be determined by testing with a conventional means in the art. For example, the pore diameters of at least 20 recessed holes on the surface of the negative electrode active coating layer are measured by testing with a 3D profile meter, and the average value is taken.

Figure 2:
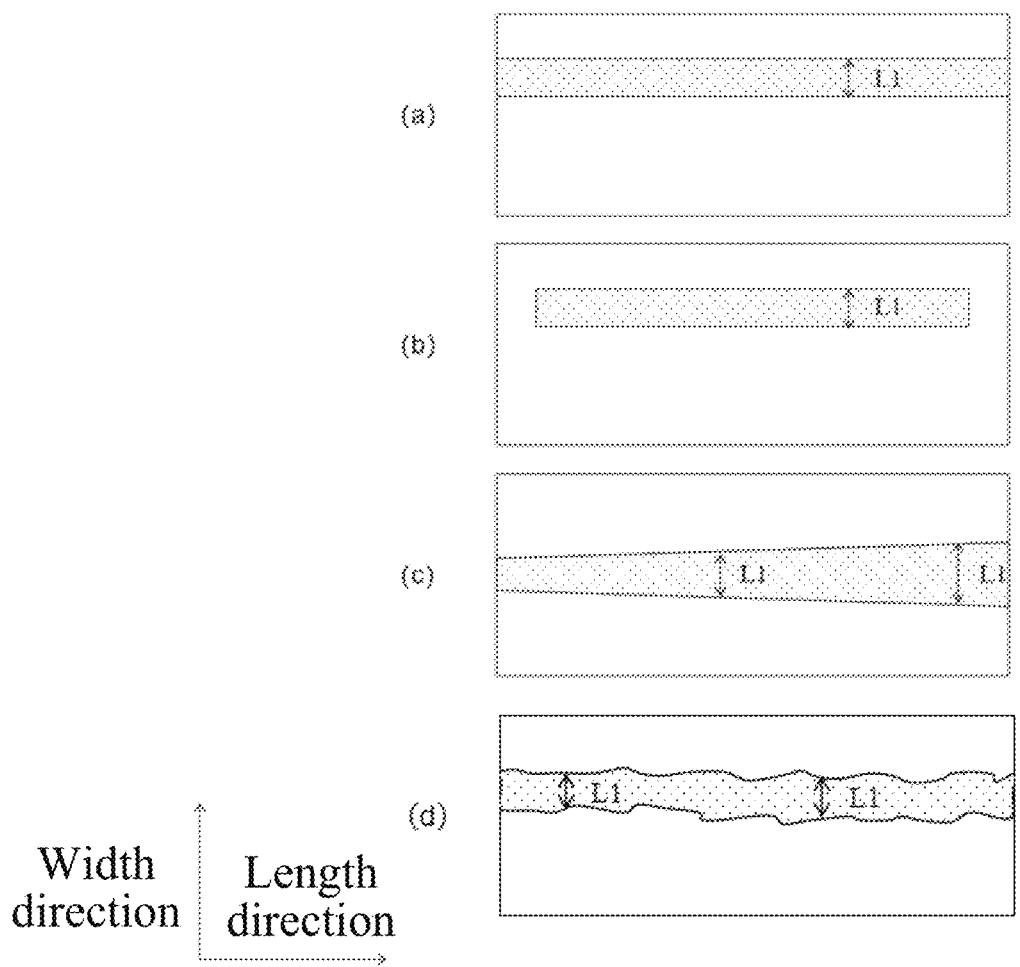
FIG. 2 is a schematic view showing the width of grooves in an example of the present disclosure, wherein in FIGS. 2(a)-2(c), two long sides of the groove are straight lines, and in FIG. 2(d), two long sides of the groove are curved lines.

When the first recesses are grooves, the width of the first recesses refers to the width of the grooves. The width of the grooves has the conventional meaning in the art. The orthographic projection of the grooves on the surface of the negative electrode plate comprises two long sides. The width of the grooves refers to the average distance from one long side to the other long side in the length direction or width direction of the negative electrode plate. FIG. 2 is a schematic view showing the width of grooves in an example of the present disclosure, wherein in FIGS. 2(a)-2(c), two long sides of the groove are straight lines, and in FIG. 2(d), two long sides of the groove are curved lines. In FIGS. 2(a) and 2(b), the two long sides are arranged in parallel, and therefore, in the width direction of the negative electrode plate, the perpendicular distance from any point on one long side to the other long side is identical. In this case, the width of the grooves is the perpendicular distance L1 from any point on one long side to the other long side in the length direction or width direction of the negative electrode plate. In FIG. 2(c), the two long sides of a groove are straight lines but are not arranged in parallel. Therefore, in the width direction, the distance from any point on one long side to the other long side is not identical. In this case, the width of the groove can be an average value. That is to say, on a long side, based on the length of the side, 50 points are selected at equal distance (that is, the inter-point distance is identical, and selecting points in this way can make the calculation result more accurate), the width L1 corresponding to each point is measured, and the average value is taken to obtain the width of the groove. In FIG. 2(d), the two long sides are curves. Therefore, in the width direction, the size from any point on one long side to the other long side is not identical. In this case, the width of the groove can also be an average value. That is to say, 50 points are randomly selected on one long side (since the two long sides in FIG. 2(d) are curves, the relationship between the two long sides in FIG. 2(c) does not exist, and therefore, 50 points can be randomly selected for measurement), the width L1 corresponding to each point is measured, and the average value is taken to obtain the width of the groove. The width of the grooves can be determined by testing with a conventional means in the art. For example, the widths of all the grooves or at least 5 grooves on the surface of the negative electrode active coating layer are measured by testing with a 3D profile meter, and the average value is taken.

In the present disclosure, the spacing between the first recesses can be 0.5-5 mm, e.g., 0.5 mm, 0.6 mm, 0.7 mm, 0.8 mm, 0.9 mm, 1 mm, 1.5 mm, 2 mm, 2.5 mm, 3 mm, 3.5 mm, 4 mm, 4.5 mm, or 5 mm.

In one example, the spacing between the first recesses is 0.8-1.5 mm.

When the first recesses are recessed holes, the spacing between the first recesses refers to the spacing between the recessed holes. The spacing between the recessed holes has the conventional meaning in the art. It refers to the shortest distance between the edges of two adjacent recessed holes on the surface of the negative electrode plate, and the spacing between the recessed holes can be determined by testing with a conventional means in the art. For example, by SEM, all or at least 10 groups of adjacent recessed holes are selected in the field of an electron microscope, the spacing is measured, and the average value is taken.

Figure 3:
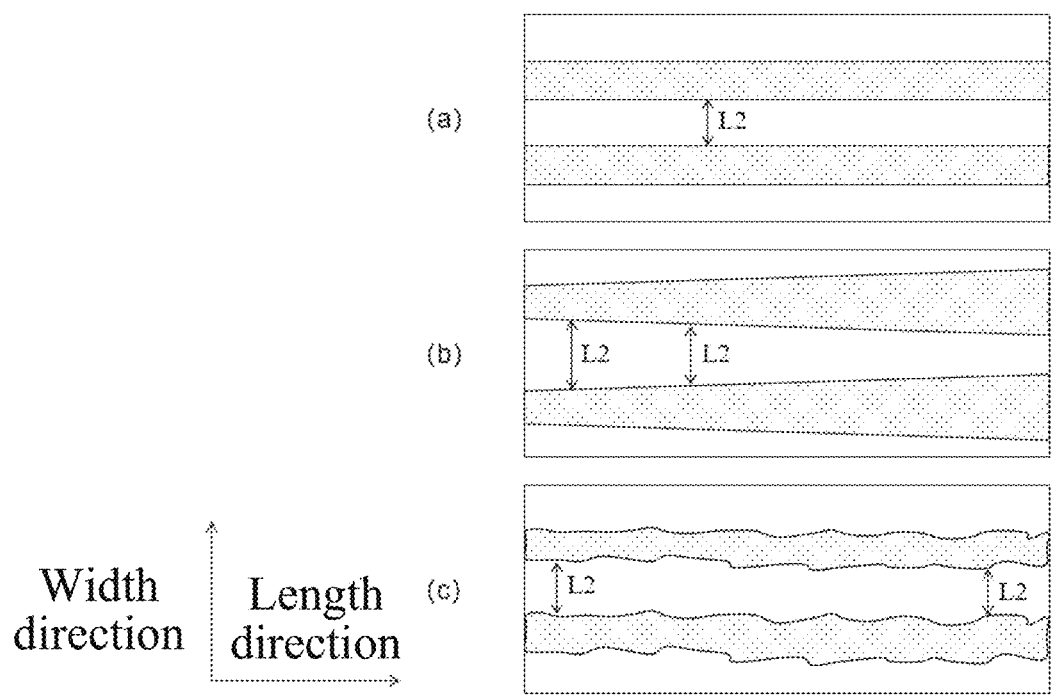

When the first recesses are grooves, the spacing between the first recesses refers to the spacing between the grooves. It can be understood that when there is only one groove on the surface of the negative electrode plate, no groove spacing exists. The spacing between the grooves has the conventional meaning in the art and refers to the average distance between two adjacent long sides of two adjacent grooves in the length direction or width direction of the negative electrode plate. FIG. 3 is a schematic view showing the spacing of grooves in an example of the present disclosure, wherein FIG. 3(a) shows the case where two adjacent long sides are straight and parallel, FIG. 3(b) shows the case where two adjacent long sides are straight and non-parallel, and FIG. 3(c) shows the case where two adjacent long sides are curved. In FIG. 3(a), two adjacent long sides are straight lines and arranged in parallel, and therefore, in the width direction, the distance from any point on one long side to the other long side is identical. In this case, the spacing between the grooves is the distance L2 from any point on one long side to the other long side in the width direction. In FIG. 3(b), two adjacent long sides are straight lines, but are not arranged in parallel. Therefore, in the width direction, the distance from any point on one long side to the other long side is not identical. In this case, the spacing between the grooves can be an average value. That is to say, on a long side, based on the length of the side, 50 points are selected at equal distance (that is, the inter-point distance is identical, and selecting points in this way can make the calculation result more accurate), the width L2 corresponding to each point is measured, and the average value is taken to obtain the spacing. In FIG. 3(c), two adjacent long sides are curves. Therefore, in the width direction, the distance from any point on one long side to the other long side is not identical. In this case, the spacing between the grooves can also be an average value. That is to say, 50 points are randomly selected on one long side (since the two long sides in FIG. 3(c) are curves, the relationship between the two long sides in FIG. 3(b) does not exist, and therefore, 50 points can be randomly selected for measurement), the width L2 corresponding to each point is measured, and the average value is taken to obtain the spacing. The spacing between the grooves can be determined by testing with a conventional means in the art. For example, the spacings between all the grooves or at least 5 grooves on the surface of the negative electrode active coating layer are measured by testing with a 3D profile meter, and the average value is taken.

In the present disclosure, the positive electrode plate can comprise a positive electrode current collector and the positive electrode active coating layer located on a surface on at least one side of the positive electrode current collector. The length of the positive electrode active coating layer located on a first surface of the positive electrode current collector is greater than the length of the positive electrode active coating layer located on a second surface of the positive electrode current collector. It can be appreciated that when coating the positive electrode plate, there are a single-sided coating region and a double-sided coating region, wherein the single-sided coating region is namely a positive electrode current collector located in the region, and only the surface on one side has the positive electrode active coating layer; and the double-sided coating region is namely the positive electrode current collector located in the region, and the surfaces on both sides have the positive electrode active coating layer. This leads to the case where the lengths of the positive electrode active coating layers on the surfaces on both sides of the positive electrode plate are not identical. In the present disclosure, the surface of the positive electrode active coating layer on the relatively long length surface of the positive electrode current collector is defined as a first surface, and the relatively short length surface of the positive electrode active coating layer is defined as a second surface. A region where a projection of the positive electrode active coating layer located on the first surface overlaps with a projection of the positive electrode active coating layer located on the second surface in the thickness direction of the positive electrode plate is namely the double-sided coating region, and a region where the projections do not overlap is namely single-sided coating region. Due to the special structure of a wound battery, the first surface usually faces the winding center of the jelly roll, and the second surface faces away from the winding center of the jelly roll.

In the present disclosure, a surface of the positive electrode active coating layer located on the first surface has second recesses, and a surface of the positive electrode active coating layer located on the second surface has protrusions. Embossing the surface of the positive electrode plate can obtain a structure with recesses on one side and protrusions on the other side.

The storage location of the electrolyte solution in the battery is distributed in the gap between the jelly roll and an aluminum-plastic film and the interlayer gap in the electrode plates. Interlayer storage mainly depends on slow infiltration by pores in the electrode plates and capillary effects, which requires a longer time and is more difficult in infiltration than the case of the gap between the jelly roll and the aluminum-plastic film. Therefore, the liquid storage capacity of the inner layers of electrode plate of the jelly roll is significantly less than that of the outer layers of electrode plate. By performing an embossing process on the positive electrode plate so that one side has recesses, and the other side has protrusions, more liquid storage places can be provided, the ion transport distance is shortened, and the polarization of the positive and negative electrode plates is reduced, thus improving the overall charging speed of the battery.

Figure 4:
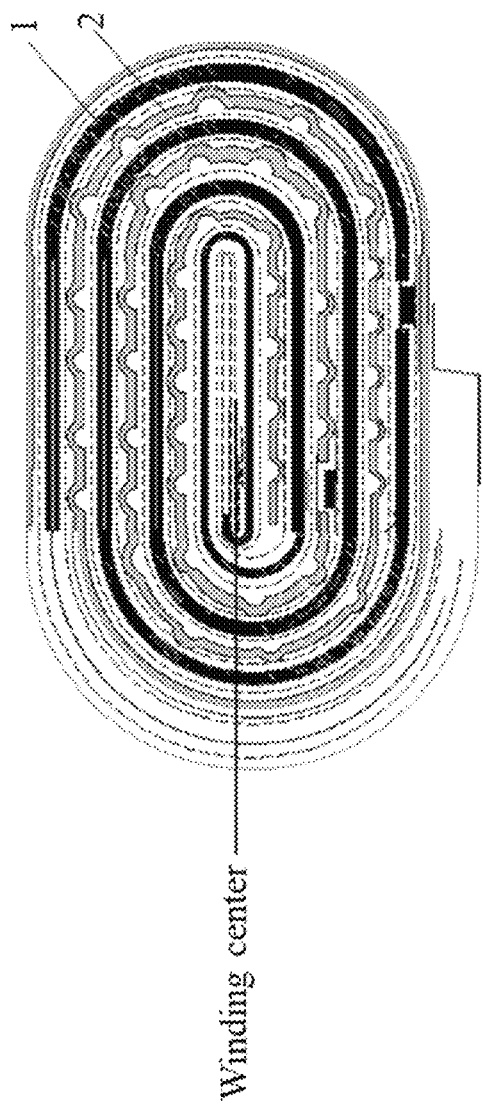
FIG. 4 is a schematic view showing the structure of a jelly roll in an example of the present disclosure.

Furthermore, the inventors of the present disclosure have conducted stress analysis on the positive electrode active coating layer facing and away from the winding center in the jelly roll and have found that when the first surface facing the winding center is provided with recesses and the second surface away from the winding center is provided with protrusions, this is not only beneficial to the structural stability of the positive electrode plate itself, but can also provide a better buffer space for the volume expansion of the negative electrode plate, so that the cycling life of the battery can be prolonged. FIG. 4 is a schematic view showing the structure of a jelly roll in an example of the present disclosure. As can be seen from the figure, the jelly roll comprises a negative electrode plate 1 and a positive electrode plate 2; the surface of the positive electrode active coating layer located on the first surface has second recesses, and the surface of the positive electrode active coating layer located on the second surface has protrusions; and the first surface faces the winding center of the jelly roll, and the second surface faces away from the winding center of the jelly roll.

In the present disclosure, the shapes of the orthographic projections of the second recesses and the protrusions on the surface of the positive electrode plate are not limited and can be circular, elliptical, linear (including straight or wavy lines), polygonal, or other shapes.

Figure 5:
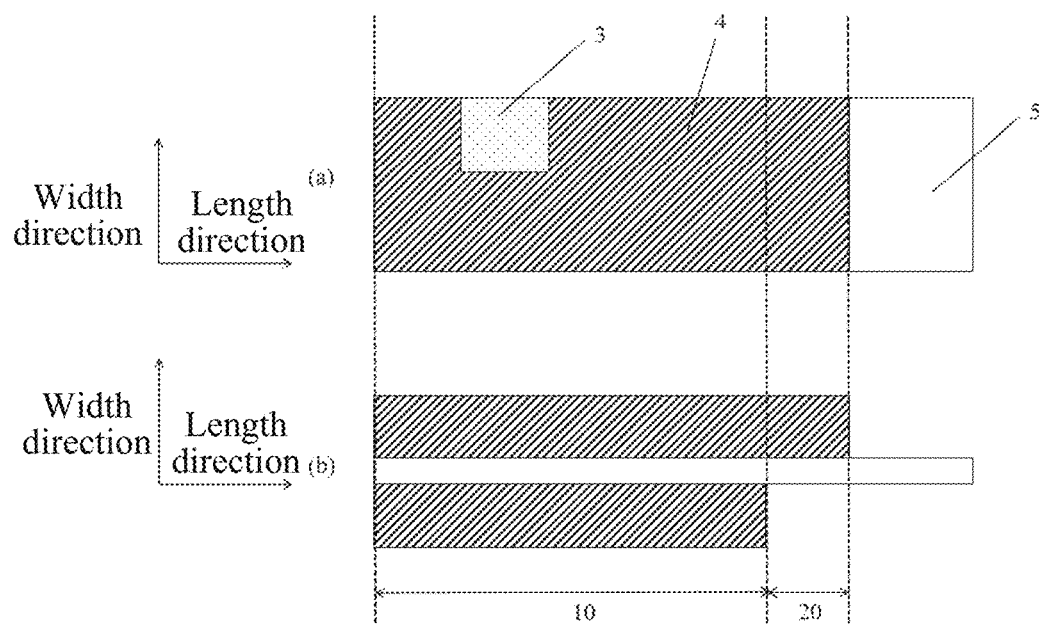

In the present disclosure, the positive electrode plate comprises a positive electrode tab welding region, a pasting region, and an empty foil region. The empty foil region refers to the region on the positive electrode current collector that is not coated with the positive electrode active coating layer except the positive electrode tab welding region. The pasting region comprises the double-sided coating region and the single-sided coating region. FIG. 5 is a schematic view showing the structure of a positive electrode plate in an example of the present disclosure, wherein FIG. 5($a$) is a top view, and FIG. 5($b$) is a cross-sectional view along the thickness direction. As can be seen from the figure, the positive electrode plate comprises a positive electrode tab welding region 3, a pasting region 4, and empty foil region 5, wherein the pasting region 4 comprises a double-sided coating region 10 and a single-sided coating region 20. In one example, the second recesses and the protrusions are located on the pasting region.

In one example, the second recesses and the protrusions are located in the double-sided coating region.

In one example, the second recesses and the protrusions are located on the pasting region and located on the double-sided coating region.

In the present disclosure, the distance from the second recesses to an edge of the positive electrode tab welding region is w1, with 0 mm<w1≤10 mm, e.g., 0.1 mm, 0.5 mm, 1 mm, 2 mm, 3 mm, 4 mm, 5 mm, 6 mm, 7 mm, 8 mm, 9 mm, or 10 mm.

In the present disclosure, the distance from the second recesses to an edge of a first side of the pasting region is w2, with 2 mm≤w2≤40 mm, e.g., 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 25 mm, 30 mm, 35 mm, or 40 mm. The first side is the side where the positive electrode tab welding region is arranged.

In the present disclosure, the distance from the second recesses to an edge of a second side of the pasting region is w3, with 2 mm≤w3≤25 mm, e.g., 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, or 25 mm. The second side is a side opposite to the side where the positive electrode tab welding region is arranged.

In the present disclosure, the distance from the second recesses to an edge of a third side of the pasting region is w4, with 0 mm<w4≤20 mm, e.g., 0.1 mm, 0.5 mm, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm. The third side is a side of the pasting region close to a winding head end.

In the present disclosure, the distance from the second recesses to a boundary line between the double-sided coating region and the single-sided coating region is w5, with 0 mm<w5≤20 mm, e.g., 0.1 mm, 0.5 mm, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm.

By controlling w1, w2, w3, w4, and w5, it can ensure that the positive electrode plate does not shed powder, which is beneficial to improving the cycling life of the battery.

Figure 6:
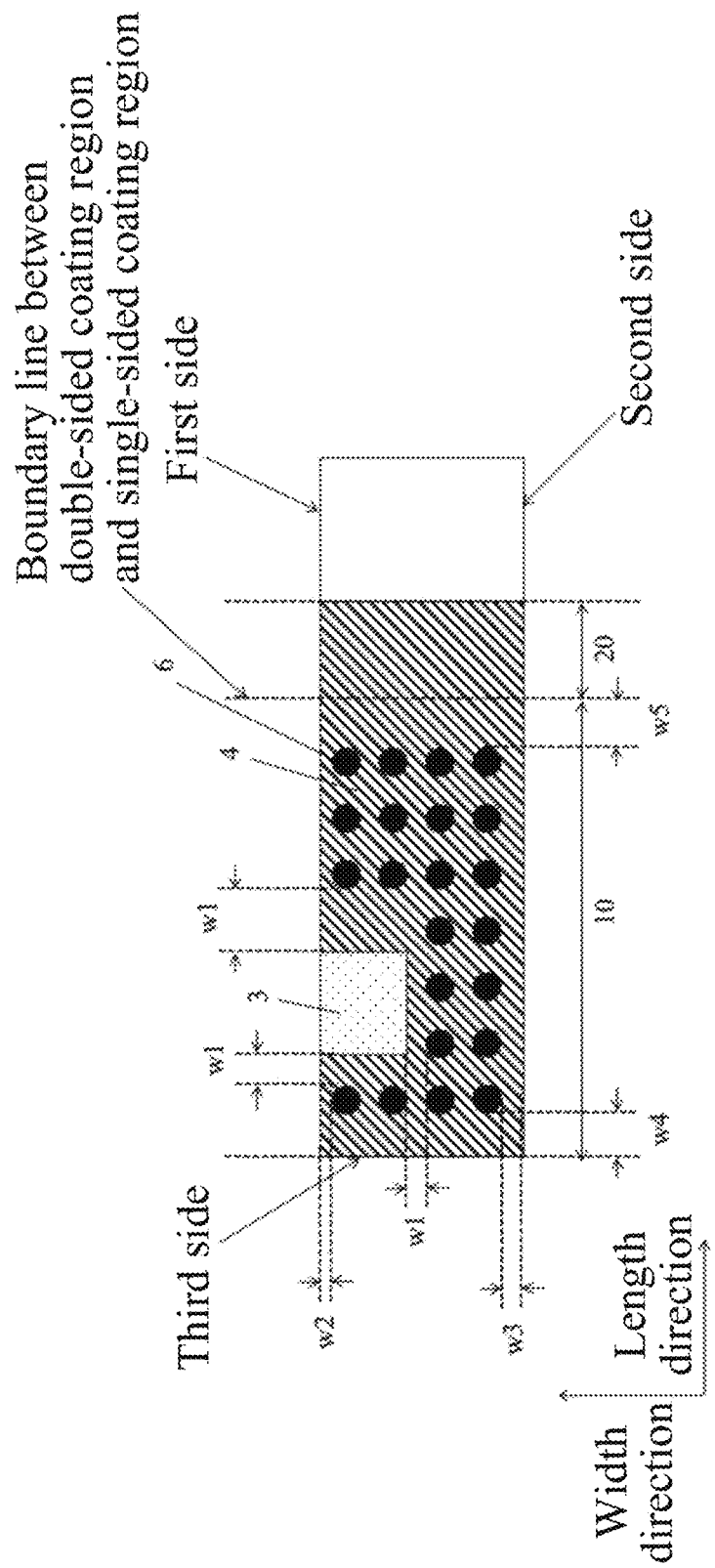
FIG. 6 is a schematic top view showing a first surface of a positive electrode plate in an example of the present disclosure.

FIG. 6 is a schematic top view showing a first surface of a positive electrode plate in an example of the present disclosure. As can be seen from the figure, the first surface has a plurality of second recesses 6, wherein the distance from the second recesses 6 to an edge of the positive electrode tab welding region 3 is w1, the distance from the second recesses 6 to the edge of the first side of the pasting region 4 is w2, the distance from the second recesses 6 to the edge of the second side of the pasting region 4 is w3, the distance from the second recesses 6 to the edge of the third side of the pasting region 4 is w4, and the distance from the second recesses 6 to the boundary line between the double-sided coating region 10 and the single-sided coating region 20 is w5.

In the present disclosure, the depth of the second recesses can be 3-40 μm, e.g., 3μ, 5 μm, 10 μm, 15 μm, 20 μm, 25 μm, 30 μm, 35 μm, or 40 μm. The height of the protrusions can be 3-40 μm, e.g., 3 μm, 5 μm, 10 μm, 15 μm, 20 μm, 25 μm, 30 μm, 35 μm, or 40 μm.

In one example, the depth of the second recesses is 10-30 μm. The height of the protrusions is 10-30 μm.

In the present disclosure, the depth of the second recesses and the height of the protrusions have the conventional meanings in the art. The depth of the second recesses refers to the perpendicular distance from the lowest point in the second recesses to the surface of the positive electrode plate. The height of the protrusions refers to the perpendicular distance from the highest point on the protrusions to the surface of the positive electrode plate. The depth of the second recesses and the height of the protrusions can be determined by testing with a conventional method in the art. For example, by a 3D profile meter, at least 20 second recesses or 20 protrusions are selected on the surface of the positive electrode plate, the depth of each second recess is measured, and an average value is taken to obtain the depth of the second recesses; and the height of each protrusion is measured, and an average value is taken to obtain the height of the protrusions.

In the present disclosure, the width of the second recesses can be 0.2-8 mm, e.g., 0.2 mm, 0.5 mm, 1 mm, 2 mm, 3 mm, 4 mm, 5 mm, 6 mm, 7 mm, or 8 mm. The width of the protrusions can be 0.2-8 mm, e.g., 0.2 mm, 0.5 mm, 1 mm, 2 mm, 3 mm, 4 mm, 5 mm, 6 mm, 7 mm, or 8 mm.

In one example, the width of the second recesses is 1-3 mm. The width of the protrusions is 1-3 mm.

In the present disclosure, when the shape of the projection of the second recesses in the thickness direction of the positive electrode plate is a regular circle, the width of the second recesses is namely the diameter of the regular circle; When the shape of the projection of the second recesses in the thickness direction of the positive electrode plate is an "irregular circle", the width of the second recesses is namely the equivalent diameter of a circle with the same area as the irregular circle. By the same reasoning, when the shape of the projection of the protrusions in the thickness direction of the positive electrode plate is a regular circle, the width of the protrusions is namely the diameter of the regular circle; and when the shape of the projection of the protrusions in the thickness direction of the positive electrode plate is an "irregular circle", the width of the protrusions is namely the equivalent diameter of a circle with the same area as the irregular circle. The width of the second recesses and the width of the protrusions can be determined by testing with a conventional method in the art, for example, by a 3D profile meter.

In the present disclosure, the spacing between the second recesses can be 0.5-8 mm, e.g., 0.5 mm, 1 mm, 2 mm, 3 mm, 4 mm, 5 mm, 6 mm, 7 mm, or 8 mm. The spacing between the protrusions can be 0.5-8 mm, e.g., 0.5 mm, 1 mm, 2 mm, 3 mm, 4 mm, 5 mm, 6 mm, 7 mm, or 8 mm.

In one example, the spacing between the second recesses is 1-3 mm. The spacing between the protrusions is 1-3 mm.

In the present disclosure, the spacing between the second recesses refers to the shortest distance between the edges of the orthographic projections of two adjacent second recesses on the surface of the positive electrode plate. By the same reasoning, the spacing between the protrusions refers to the shortest distance between the edges of the orthographic projections of two adjacent protrusions on the surface of the positive electrode plate. The spacing between the second recesses and the spacing between the protrusions can be determined by testing with a conventional method in the art. For example, by a 3D profile meter, at least 10 groups of adjacent second recesses or protrusions are selected on the surface of the positive electrode plate, the spacing is measured, and the average value is taken.

In the present disclosure, the positive electrode active coating layer can further comprise a positive electrode conductive agent and a positive electrode binder, and the negative electrode active coating layer can further comprise a negative electrode conductive agent and a negative electrode binder. For both the positive electrode conductive agent and the negative electrode conductive agent, conductive agents conventionally used in the art can be used. For both the positive electrode binder and the negative electrode binder, binders conventionally used in the art can be used.

It should be noted that the digital representations such as "first" and "second" in the present disclosure are only used to distinguish different materials or usage modes and do not represent the difference in order.

The present disclosure will be described in detail below by means of examples. The examples described in the present disclosure are only some, rather than all, of the examples of the present disclosure. Based on the examples in the present disclosure, all other examples obtained by those of ordinary skill in the art without involving creative effort belong to the scope of protection of the present disclosure.

In the following examples, unless otherwise specified, all the materials used are commercially available and analytically pure.

The following examples are used to illustrate the lithium-ion secondary battery of the present disclosure.

Example 1

A battery was prepared according to the following method.

(1) Preparation of Positive Electrode Plate

Lithium cobaltate ($M^1$ included Al), solid electrolyte (lithium aluminum titanium phosphorus oxide, with a chemical formula of $Li_{1.3}Al_{0.3}Ti_{1.7}(PO_4)_3$ and an average particle size of 1.5 μm), a positive electrode conductive agent (conductive carbon black), and positive electrode binder (polyvinylidene fluoride) were mixed in a mass ratio of 96.039:0.961:1:2, then N-methylpyrrolidone (NMP) was added, and the mixture was stirred until uniform to prepare a positive electrode slurry; the above positive electrode slurry was applied to a first surface and a second surface of an aluminum foil (the coating length of the positive electrode slurry on the first surface of the aluminum foil was greater than that on the second surface), and the aluminum foil was baked and rolled to obtain a positive electrode plate with a thickness of 100 μm; a positive electrode tab welding region with a fixed size (the size of the positive electrode tab welding region in the width direction of the positive electrode plate was 20 mm) was arranged on the pasting region of the positive electrode plate, and a nickel tab was welded in the above positive electrode tab welding region by laser; furthermore, after passing over a roller, an embossing treatment was carried out from the first surface to the second surface in the double-sided coating region (with the positive electrode tab welding region being avoided) to obtain second recesses (first surface) and protrusions (second surface), wherein the shape of the orthographic projections of the second recesses and the protrusions on the surface of the positive electrode plate was circular; wherein the mass content c1 of the element Al in the positive electrode active coating layer was 8273 ppm, the mass content c3 of the characteristic element (Ti) in the positive electrode active coating layer was 1578 ppm, the mass content c4 of the element Co in the positive electrode active coating layer was 580215 ppm, c3/c4 was 0.0027, and c3×c1 was $1.31 \times 10^{-5}$; the width of the second recesses was 2 mm, the depth was 20 μm, and the spacing was 2 mm; and w1 was 7 mm, w2 was 27 mm, w3 was 15 mm, w4 was 7 mm, and w5 was 7 mm.

(2) Preparation of Negative Electrode Plate

Artificial graphite (secondary particles), a silicon-carbon material (the proportion of the number of primary spherical particles relative to the total number of the primary spherical particles and secondary spherical particles was 0.55, the average particle size of the primary spherical particles was 4.1 μm, and the mass content of the element Si in the silicon-carbon material was 40%), a negative electrode conductive agent (carbon nanotubes), a negative electrode dispersant (lithium carboxymethyl cellulose), and a negative electrode binder (polyacrylic acid) were mixed in a mass ratio of 77:20:0.4:0.1:2.5, and then deionized water was added to prepare a negative electrode slurry; the above negative electrode slurry was applied to the surfaces on both sides of a carbon-coated copper foil, baked, and rolled to obtain a negative electrode plate with a thickness of 110 μm; and first recesses (grooves) were made on the surface of the negative electrode plate by laser;

wherein the mass content c2 of the element Si in the negative electrode active coating layer was 8%, the width of the grooves was 79.6 μm, the depth was 20.2 μm, and the spacing was 1.3 mm.

(3) Preparation of Electrolyte Solution

In a glove box ($H_2O$<0.01 ppm, $O_2$<0.01 ppm, and Ar atmosphere), ethylene carbonate, propylene carbonate, and diethyl carbonate were mixed in a weight ratio of 1:3:6 to obtain an organic solvent; based on the total mass of the electrolyte solution, 45% of a carboxylate compound (PP) was then added to form a mixed solvent; and based on the total mass of the electrolyte solution, 15% of fluoroethylene carbonate, 7.5% of VC (c5 was 7.5%), and 12.5% of lithium hexafluorophosphate were dissolved in the above mixed solvent to obtain the electrolyte solution.

(4) Preparation of Separator 1,3,5-Triazine-2,4,6-triamine was ground and then uniformly mixed with styrene-butadiene rubber and lithium polyacrylate in a mass ratio of 63:30:7, and NMP was added to obtain an organic coating layer slurry; the above organic coating layer slurry was applied to the surface on one side of the polyethylene film and dried (to form an organic coating layer with a thickness h of 1.3 μm); and a PMMA adhesive layer was applied to the surface on the other side of the polyethylene film, and PVDF+PMMA adhesive layer (in a mass ratio of PVDF to PMMA of 7:3) was applied to the outer surface of the organic coating layer to obtain the separator, wherein the mass content of the element N in the organic coating layer was 28%.

(5) Preparation of Battery

The positive electrode plate prepared in step (1), the separator prepared in step (4), and the negative electrode plate prepared in step (2) were wound to obtain a jelly roll (wherein the organic coating layer directly faced the positive electrode plate); and after encapsulation, baking, injection, formation, secondary encapsulation, sorting, and OCV, the battery was obtained.

Example 2

A battery was prepared according to the following method.

(1) Preparation of Positive Electrode Plate

Lithium cobaltate ($M^1$ included Al), solid electrolyte (lithium aluminum titanium phosphorus oxide, with a chemical formula of $Li_{1.3}Al_{0.3}Ti_{1.7}(PO_4)_3$ and an average particle size of 1.2 μm), a positive electrode conductive agent (conductive carbon black), and positive electrode binder (polyvinylidene fluoride) were mixed in a mass ratio of 96.042:0.958:1:2, N-methylpyrrolidone (NMP) was added, and the mixture was stirred until uniform to prepare a positive electrode slurry; the above positive electrode slurry was applied to a first surface and a second surface of an aluminum foil (the coating length of the positive electrode slurry on the first surface of the aluminum foil was greater than that on the second surface), and the aluminum foil was baked and rolled to obtain a positive electrode plate with a thickness of 100 μm; a positive electrode tab welding region with a fixed size (the size of the positive electrode tab welding region in the width direction of the positive electrode plate was 15 mm) was arranged on the pasting region of the positive electrode plate, and a nickel tab was welded in the above positive electrode tab welding region by laser; furthermore, after passing over a roller, an embossing treatment was carried out from the first surface to the second surface in the double-sided coating region (with the positive electrode tab welding region being avoided) to obtain second recesses (first surface) and protrusions (second surface), wherein the shape of the orthographic projections of the second recesses and the protrusions on the surface of the positive electrode plate was circular; wherein the mass content c1 of the element Al in the positive electrode active coating layer was 7126 ppm, the mass content c3 of the characteristic element (Ti) in the positive electrode active coating layer was 1991 ppm, the mass content c4 of the element Co in the positive electrode active coating layer was 564282 ppm, c3/c4 was 0.0035, and c3×c1 was $1.42 \times 10^{-5}$; the width of the second recesses was 1 mm, the depth was 10 μm, and the spacing was 1 mm; and w1 was 5 mm, w2 was 20 mm, w3 was 10 mm, w4 was 5 mm, and w5 was 5 mm.

(2) Preparation of Negative Electrode Plate

Artificial graphite (secondary particles), a silicon-carbon material (the proportion of the number of primary spherical particles relative to the total number of the primary spherical particles and secondary spherical particles was 0.32, the average particle size of the primary spherical particles was 3 μm, and the mass content of the element Si in the silicon-carbon material was 40%), a negative electrode conductive agent (carbon nanotubes), a negative electrode dispersant (lithium carboxymethyl cellulose), and a negative electrode binder (polyacrylic acid) were mixed in a mass ratio of 77:20:0.4:0.1:2.5, and deionized water was added to prepare a negative electrode slurry; the above negative electrode slurry was applied to the surfaces on both sides of a carbon-coated copper foil, baked, and rolled to obtain a negative electrode plate with a thickness of 110 μm; and first recesses (grooves) were made on the surface of the negative electrode plate by laser;

wherein the mass content c2 of the element in the negative electrode active coating layer was 8%, the width of the grooves was 60.1 μm, the depth was 15.4 μm, and the spacing was 0.8 mm.

(3) Preparation of Electrolyte Solution

In a glove box ($H_2O$<0.01 ppm, $O_2$<0.01 ppm, and Ar atmosphere), ethylene carbonate, propylene carbonate, and diethyl carbonate were mixed in a weight ratio of 1:3:6 to obtain an organic solvent; based on the total mass of the electrolyte solution, 20% of a carboxylate compound (PP) was then added to form a mixed solvent; and based on the total mass of the electrolyte solution, 15% of fluoroethylene carbonate, 10% of VC (c5 was 10%), and 12.5% of lithium hexafluorophosphate were dissolved in the above mixed solvent to obtain the electrolyte solution.

(4) Preparation of Separator 1,3,5-Triazine-2,4,6-triamine was ground and then uniformly mixed with styrene-butadiene rubber and lithium polyacrylate at a mass ratio of 40:50:10, and NMP was added to obtain an organic coating layer slurry; the above organic coating layer slurry was applied to the surface on one side of the polyethylene film and dried (to form an organic coating layer with a thickness h of 1 μm); and a PMMA adhesive layer was applied to the surface on the other side of the polyethylene film, and PVDF+PMMA adhesive layer (in a mass ratio of PVDF to PMMA of 7:3) was applied to the outer surface of the organic coating layer to obtain the separator, wherein the mass content of the element N in the organic coating layer was 15%.

(5) Preparation of Battery

The positive electrode plate prepared in step (1), the separator prepared in step (4), and the negative electrode plate prepared in step (2) were wound to obtain a jelly roll (wherein the organic coating layer directly faced the positive electrode plate); and after encapsulation, baking, injection, formation, secondary encapsulation, sorting, and OCV, the battery was obtained.

Example 3

A battery was prepared according to the following method.

(1) Preparation of Positive Electrode Plate

Lithium cobaltate ($M^1$ included Al), solid electrolyte (lithium aluminum titanium phosphorus oxide, with a chemical formula of $Li_{1.3}Al_{0.3}Ti_{1.7}(PO_4)_3$ and an average particle size of 1.7 μm), a positive electrode conductive agent (conductive carbon black), and positive electrode binder (polyvinylidene fluoride) were mixed in a mass ratio of 96.033:0.967:1:2, N-methylpyrrolidone (NMP) was added, and the mixture was stirred until uniform to prepare a positive electrode slurry; the above positive electrode slurry was applied to a first surface and a second surface of an aluminum foil (the coating length of the positive electrode slurry on the first surface of the aluminum foil was greater than that on the second surface), and the aluminum foil was baked and rolled to obtain a positive electrode plate with a thickness of 100 μm; a positive electrode tab welding region with a fixed size (the size of the positive electrode tab welding region in the width direction of the positive electrode plate was 25 mm) was arranged on the pasting region of the positive electrode plate, and a nickel tab was welded in the above positive electrode tab welding region by laser; furthermore, after passing over a roller, an embossing treatment was carried out from the first surface to the second surface in the double-sided coating region (with the positive electrode tab welding region being avoided) to obtain second recesses (first surface) and protrusions (second surface), wherein the shape of the orthographic projections of the second recesses and the protrusions on the surface of the positive electrode plate was circular; wherein the mass content c1 of the element Al in the positive electrode active coating layer was 9986 ppm, the mass content c3 of the characteristic element (Ti) in the positive electrode active coating layer was 936 ppm, the mass content c4 of the element Co in the positive electrode active coating layer was 618542 ppm, c3/c4 was 0.0015, and c3×c1 was $9.35×10^{-6}$; the width of the second recesses was 3 mm, the depth was 30 μm, and the spacing was 3 mm; and w1 was 9 mm, w2 was 34 mm, w3 was 20 mm, w4 was 10 mm, and w5 was 10 mm.

(2) Preparation of Negative Electrode Plate

Artificial graphite (secondary particles), a silicon-carbon material (the proportion of the number of primary spherical particles relative to the total number of the primary spherical particles and secondary spherical particles was 0.79, the average particle size of the primary spherical particles was 4.9 μm, and the mass content of the element Si in the silicon-carbon material was 40%), a negative electrode conductive agent (carbon nanotubes), a negative electrode dispersant (lithium carboxymethyl cellulose), and a negative electrode binder (polyacrylic acid) were mixed in a mass ratio of 77:20:0.4:0.1:2.5, and deionized water was added to prepare a negative electrode slurry; the above negative electrode slurry was applied to the surfaces on both sides of a carbon-coated copper foil, baked, and rolled to obtain a negative electrode plate with a thickness of 110 μm; and first recesses (grooves) were made on the surface of the negative electrode plate by laser;

wherein the mass content c2 of the element in the negative electrode active coating layer was 8%, the width of the grooves was 99.2 μm, the depth was 29.5 μm, and the spacing was 1.5 mm.

(3) Preparation of Electrolyte Solution

In a glove box ($H_2O$<0.01 ppm, $O_2$<0.01 ppm, and Ar atmosphere), ethylene carbonate, propylene carbonate, and diethyl carbonate were mixed in a weight ratio of 1:3:6 to obtain an organic solvent; based on the total mass of the electrolyte solution, 65% of a carboxylate compound (PP) was then added to form a mixed solvent; and based on the total mass of the electrolyte solution, 15% of fluoroethylene carbonate, 5% of VC (c5 was 5%), and 12.5% of lithium hexafluorophosphate were dissolved in the above mixed solvent to obtain the electrolyte solution.

(4) Preparation of Separator 1,3,5-Triazine-2,4,6-triamine was ground and then uniformly mixed with styrene-butadiene rubber and lithium polyacrylate at a mass ratio of 80:15:5, and NMP was added to obtain an organic coating layer slurry; the above organic coating layer slurry was applied to the surface on one side of the polyethylene film and dried (to form an organic coating layer with a thickness h of 2 μm); and a PMMA adhesive layer was applied to the surface on the other side of the polyethylene film, and PVDF+PMMA adhesive layer (in a mass ratio of PVDF to PMMA of 7:3) was applied to the outer surface of the organic coating layer to obtain the separator, wherein the mass content of the element N in the organic coating layer was 35%.

(5) Preparation of Battery

The positive electrode plate prepared in step (1), the separator prepared in step (4), and the negative electrode plate prepared in step (2) were wound to obtain a jelly roll (wherein the organic coating layer directly faced the positive electrode plate); and after encapsulation, baking, injection, formation, secondary encapsulation, sorting, and OCV, the battery was obtained.

Example 4 Group

This group of examples was used to verify the influence of the change of "the mass content c1 of the element Al in the positive electrode active coating layer".

This group of examples was carried out with reference to Example 1, except that c1 was changed, specifically as follows:

in Example 4a, c1 was 6852 ppm, and c3×c1 was $1.08 \times 10^{-5}$; and in Example 4b, c1 was 14874 ppm, and c3×c1 was $2.35 \times 10^{-5}$.

Example 5 Group

This group of examples was used to verify the influence of the change of "the solid electrolyte type".

This group of examples was carried out with reference to Example 1, except that the solid electrolyte was changed, specifically as follows:

in Example 5a, the lithium aluminum titanium phosphorus oxide was replaced by lithium lanthanum zirconium tantalum oxide with a chemical formula of $Li_{6.5}La_3Zr_{1.5}Ta_{0.5}O_{12}$; in addition, in order to control the mass content c3 of the characteristic element to be close to that of Example 1, the ratio of the components of the positive electrode slurry was adjusted, such that the mass ratio of lithium cobaltate, the solid electrolyte, the positive electrode conductive agent and the positive electrode binder was 96.047:0.953:1:2, wherein the mass content c3 of the characteristic element (Zr) was 1676; and in Example 5b, the lithium aluminum titanium phosphorus oxide was replaced by lithium lanthanum titanium oxide with a chemical formula of $Li_{30.3}La_{0.567}TiO_3$, and the ratio of components of the positive electrode slurry was adjusted as above, such that the mass ratio of lithium cobaltate, the solid electrolyte, the positive electrode conductive agent and the positive electrode binder was 96.032:0.968:1:2, wherein the mass content c3 of the characteristic element (La) was 1628.

Example 6 Group

This group of examples was used to verify the influence of the change of "the mass content c2 of the element Si in the negative electrode active coating layer".

This group of examples was carried out with reference to Example 1, except that c2 was adjusted by changing the mass contents of the graphite material and the silicon-carbon material in the negative electrode slurry, specifically as follows:

in Example 6a, artificial graphite, a silicon-carbon material, a negative electrode conductive agent, a negative electrode dispersant, and a negative electrode binder were mixed in a mass ratio of 87:10:0.4:0.1:2.5, wherein c2 was 4%;

in Example 6b, artificial graphite, a silicon-carbon material, a negative electrode conductive agent, a negative electrode dispersant, and a negative electrode binder were mixed in a mass ratio of 67:30:0.4:0.1:2.5, wherein c2 was 12%;

in Example 6c, artificial graphite, a silicon-carbon material, a negative electrode conductive agent, a negative electrode dispersant, and a negative electrode binder were mixed in a mass ratio of 93:4:0.4:0.1:2.5, wherein c2 was 1.6%; and in Example 6d, artificial graphite, a silicon-carbon material, a negative electrode conductive agent, a negative electrode dispersant, and a negative electrode binder were mixed in a mass ratio of 52:45:0.4:0.1:2.5, wherein c2 was 18%.

Example 7 Group

This group of examples was used to verify the influence of the change of "the mass content c3 of the characteristic element in the positive electrode active coating layer".

This group of examples was carried out with reference to Example 1, except that c3 was adjusted by changing the content of the solid electrolyte in the positive electrode slurry, specifically as follows:

in Example 7a, the ratio of components of the positive electrode slurry was such that the mass ratio of lithium cobaltate, the solid electrolyte, the positive electrode conductive agent and the positive electrode binder was 96.031:0.969:1:2, and c3 was 605 ppm; and c3/c4 was 0.001, and c3×c1 was $5.01 \times 10^{-6}$;

in Example 7b, the ratio of components of the positive electrode slurry was such that the mass ratio of lithium cobaltate, the solid electrolyte, the positive electrode conductive agent and the positive electrode binder was 96.05:0.95:1:2, and c3 was 2967 ppm; and c3/c4 was 0.0051, and c3×c1 was $2.45 \times 10^{-5}$.

Example 8 Group

This group of examples was used to verify the influence of the change of "the product c3×c1 of the mass content c3 of the characteristic element in the positive electrode active coating layer and the mass content c1 of the element Al in the positive electrode active coating layer".

This group of examples was carried out with reference to Examples 2 and 3, respectively, except that c3×c1 was adjusted by changing c1, specifically as follows:

Example 8a was carried out with reference to Example 2, except that c1 was 9875 ppm, and c3×c1 was $1.97 \times 10^{-5}$; and Example 8b was carried out with reference to Example 3, except that c1 was 7233 ppm, and c3×c1 was $6.77 \times 10^{-6}$.

Example 9

This example was used to verify the influence of "whether the second recesses were located on the surface of positive electrode active coating layer on the first surface and whether the protrusions were located on the surface of positive electrode active coating layer on the second surface".

This example was carried out with reference to Example 1, except that an embossing treatment was carried out from the second surface to the first surface, that is, the surface of the positive electrode active coating layer located on the second surface had second recesses, and the surface of the positive electrode active coating layer located on the first surface had protrusions.

Example 10

This example was used to verify the influence of "no second recesses and protrusions arranged on the surface of the positive electrode active coating layer".

This example was carried out with reference to Example 1, except that no embossing treatment was carried out.

Example 11

This example was used to verify the influence of "whether the single-sided coating region had second recesses".

This example was carried out with reference to Example 1, except that an embossing treatment was carried out on the single-sided coating region and the double-sided coating region (with the positive electrode tab welding region being avoided).

Example 12 Group

This group of examples was used to verify the influence of the change of "w1, w2, w3, w4, and w5".

This group of examples was carried out with reference to Example 1, except that w1, w2, w3, w4, and w5 were changed, specifically as follows:
- in Example 12a, w1 was 0.5 mm, w2 was 2 mm, w3 was 2 mm, w4 was 0.5 mm, and w5 was 0.5 mm; and
- in Example 12b, w1 was 10 mm, w2 was 40 mm, w3 was 25 mm, w4 was 20 mm, and w5 was 20 mm.

Example 13 Group

This group of examples was used to verify the influence of the change of "the average particle size of the primary spherical particles".

This group of examples was carried out with reference to Example 1, except that adjustment was made by a change, specifically as follows:
- in Example 13a, the average particle size of the primary spherical particles was 1.1 μm; and
- in Example 13b, the average particle size of the primary spherical particles was 6 μm.

Example 14 Group

This group of examples was used to verify the influence of the change of "the proportion of the number of the primary spherical particles relative to the total number of the primary spherical particles and the secondary spherical particles".

This group of examples was carried out with reference to Example 1, except that the proportion of the number of the primary spherical particles was changed, specifically as follows:
- in Example 14a, the silicon-carbon material is entirely made up of primary spherical particles, that is, the proportion of the number of the primary spherical particles relative to the total number of the primary spherical particles and the secondary spherical particles was 1; and
- in Example 14b, the proportion of the number of the primary spherical particles relative to the total number of the primary spherical particles and the secondary spherical particles was 0.11.

Example 15

This example was carried out with reference to Example 1, except that the artificial graphite was primary particles, and the average particle size was 6.1 μm.

Example 16

This example was used to verify the influence of the change of "the type of the first recesses".

This example was carried out with reference to Example 1, except that recessed holes were made on the surface of the negative electrode plate by laser, wherein the width of the recessed holes was 85.2 μm, the depth was 20.1 μm, and the spacing was 0.5 mm.

Example 17

This example was used to verify the influence of the change of "the mass content of the carboxylate compound in the electrolyte solution".

This example was carried out with reference to Example 1, except that the content of PP was changed to 10%.

Example 18 Group

This group of examples was used to verify the influence of the change of "the mass content c5 of vinylene carbonate in the electrolyte solution".

This group of examples was carried out with reference to Example 1, except that c5 was adjusted by changing the amount of vinylene carbonate added to the electrolyte solution, specifically as follows:
- in Example 18a, no vinylene carbonate was added to the electrolyte solution, that is, c5 was 0;
- in Example 18b, c5 was 0.05%; and
- in Example 18c, c5 was 15%.

Example 19

This example was used to verify the influence of the change of "the organic coating layer".

This example was carried out with reference to Example 1, except that the organic coating layer was replaced by a boehmite ceramic coating layer with the same thickness.

Example 20

This example was used to verify the influence of "whether the organic coating layer directly faced the positive electrode plate".

This example was carried out with reference to Example 1, except that the organic coating layer directly faced the negative electrode plate.

Example 21 Group

This group of examples was used to verify the influence of the change of "the mass content of the element N in the organic coating layer".

This group of examples was carried out with reference to Example 1, except that the mass content of the element N in the organic coating layer was adjusted by changing a material in the organic coating layer or the proportion of each component, specifically as follows:
- in Example 21a, 1,3,5-triazine-2,4,6-triamine was replaced by polyacrylonitrile with the same mass, wherein the mass content of the element N in the organic coating layer was 10.5%; and
- in Example 21b, the mass ratio of 1,3,5-triazine-2,4,6-triamine, styrene-butadiene rubber and lithium polyacrylate was 94:5:1, wherein the mass content of the element N in the organic coating layer was 55%.

Example 22 Group

This group of examples was used to verify the influence of the change of "the thickness h of the organic coating layer".

This group of examples was carried out with reference to Example 1, except that h was changed, specifically as follows:

in Example 22a, h was 0.5 µm; and
in Example 22b, h was 4 µm.

The above examples all satisfied the following conditions: the average particle size of the first particles of lithium cobaltate was 0.3-7 µm, and the average particle size of the second particles of lithium cobaltate was 7.5-40 µm.

The above examples, except Example 14a, all satisfied the condition that the average particle size of the secondary spherical particles of the silicon-carbon material was 3-20 µm. The examples, except Example 15, all satisfied the condition that the average particle size of the secondary particles of the graphite material was 6-20 µm.

Comparative Example 1

This example was carried out with reference to Example 1, except that no solid electrolyte was added to the positive electrode plate, that is, the lithium cobaltate, the positive electrode conductive agent and the positive electrode binder were mixed in a mass ratio of 97:1:2, and NMP was then added to prepare a positive electrode slurry.

Comparative Example 2 Group

This group of comparative examples was used to verify the influence of the change of "the mass content c1 of the element Al in the positive electrode active coating layer".

This group of comparative examples was carried out with reference to Example 1, except that c1 was changed, specifically as follows:

in Comparative Example 2a, c1 was 6354 ppm; and
in Comparative Example 2b, c1 was 17895 ppm.

Comparative Example 3

This group of comparative examples was used to verify the influence of the change of "the mass content c2 of the element Si in the negative electrode active coating layer".

This comparative example was carried out with reference to Example 1, except that c2 was adjusted by changing the mass contents of the graphite material and the silicon-carbon material in the negative electrode slurry, specifically: artificial graphite, a silicon-carbon material, a negative electrode conductive agent, a negative electrode dispersant, and a negative electrode binder were mixed in a mass ratio of 37:60:0.4:0.1:2.5, wherein c2 was 24%.

Comparative Example 4

This comparative example was used to verify the influence of "no carboxylate compound added to the electrolyte solution".

This comparative example was carried out with reference to Example 1, except that no PP was added to the electrolyte solution.

Test Example (1) Volumetric Energy Density Test

The batteries prepared in the examples and comparative examples were subjected to a volumetric energy density test, and the specific test method was as follows:

the battery was charged to 4.5 V at a current of 0.2 C, then charged at a constant voltage until the current dropped to 0.02 C, and then discharged to 3.0 V at a current of 0.2 C, and the discharge energy was recorded as E; and the thickness, width, and length of the battery were measured, the product of the three was calculated, and the volume of the battery was recorded as V. The formula for calculating the volumetric energy density was VED=E/V, and the results were reported in Table 1.

(2) Low-Temperature Discharge Test

The batteries prepared in the examples and comparative examples were subjected to a low-temperature discharge test, and the specific test method was as follows:

at room temperature (25° C.), the battery was charged to 4.5 V at 0.2 C in a constant-current and constant-voltage manner, and the charging process was stopped at 0.02 C; after standing for 5 min, the battery was discharged to 3.0 V at 0.2 C, and the discharge capacity C1 was recorded; the battery was then charged to 4.5 V at 0.2 C in a constant-current and constant-voltage manner at room temperature, and the charging process was stopped at 0.02 C; thus, the battery was fully charged; the fully charged battery was placed in a thermostatic chamber at −20° C., left to stand for 2 hours, and then discharged to 3.0 V at 0.2 C, and the discharge capacity C2 was recorded; and C2/C1 was namely the low-temperature discharge capacity retention rate at 0.2 C at −20° C., and the results were recorded in Table 1.

(3) High-Temperature Cycling Test at 45° C.

The batteries prepared in the examples and comparative examples were subjected to a high-temperature cycling test at 45° C., and the specific test method was as follows:

the battery was left to stand in a constant-temperature room at 45° C. for 2 h, charged to 4.2 V at 3 C in a constant-current manner, then charged to 4.5 V at 2 C in a constant-current and constant-voltage manner, the charging process was stopped at 0.05 C, and the battery was left to stand for 10 min; and the battery was then discharged to 3.0 V at 0.7 C, and this process was repeated in this way for 500 cycles. The discharge capacity of the battery was measured to be C1 when it was fully charged at the 500th cycle. The discharge capacity of the battery was C0 when it was fully charged for the first time. Thus, C1/C0 was namely the capacity retention rate after 500 cycles, and the results were recorded in Table 1.

(4) High-Temperature Storage Test

The batteries prepared in the examples and comparative examples were subjected to a high-temperature storage test, and the specific test method was as follows:

at room temperature (25° C.), the battery was charged to 4.5 V at 0.2 C in a constant-current and constant-voltage manner, and the charging process was stopped at 0.02 C;

the thickness h1 in the fully charged state was measured with thickness tester 600 ppg;

and the battery was then placed at 85° C.±2° C. for 6 hours, and the battery was taken out and immediately tested for thickness h2. (h2−h1)/h1 was the thickness expansion change rate, and the results were recorded in Table 1.

TABLE 1

|  | Energy density (Wh/L) | Low-temperature discharge capacity retention rate (%) | High-temperature discharge capacity retention rate (%) | Thickness expansion change rate (%) |
| --- | --- | --- | --- | --- |
| Example 1 | 807 | 85.5 | 85.5 | 3.3 |
| Example 2 | 813 | 85.8 | 84.5 | 4.5 |
| Example 3 | 798 | 84.6 | 85.9 | 3.3 |
| Example 4a | 815 | 85.1 | 83.6 | 3.5 |
| Example 4b | 798 | 85.3 | 86.1 | 3.2 |
| Example 5a | 810 | 85.8 | 85.4 | 4.5 |
| Example 5b | 807 | 84.2 | 85.6 | 3.1 |
| Example 6a | 780 | 90.1 | 88.5 | 2.7 |
| Example 6b | 810 | 80.4 | 81.9 | 4.8 |
| Example 6c | 750 | 91.3 | 89.8 | 2.5 |
| Example 6d | 825 | 76.4 | 78.3 | 5.6 |
| Example 7a | 806 | 78.5 | 85.3 | 3.1 |
| Example 7b | 806 | 86.5 | 85.5 | 5.3 |
| Example 8a | 807 | 84.8 | 85.4 | 4.6 |
| Example 8b | 805 | 83.6 | 85.0 | 3.5 |
| Example 9 | 807 | 85.1 | 83.3 | 3.6 |
| Example 10 | 806 | 83.9 | 81.5 | 3.5 |
| Example 11 | 807 | 85.2 | 83.3 | 3.5 |
| Example 12a | 806 | 85.3 | 83.9 | 3.4 |
| Example 12b | 807 | 84.5 | 83.9 | 3.5 |
| Example 13a | 812 | 85.9 | 83.5 | 4.3 |
| Example 13b | 803 | 84.9 | 85.7 | 3.1 |
| Example 14a | 816 | 86.1 | 82.5 | 6.3 |
| Example 14b | 797 | 84.5 | 85.5 | 3.2 |
| Example 15 | 801 | 85.8 | 84.3 | 3.6 |
| Example 16 | 806 | 85.9 | 85.1 | 4.8 |
| Example 17 | 806 | 83.5 | 84.5 | 3.3 |
| Example 18a | 807 | 81.5 | 84.1 | 3 |
| Example 18b | 807 | 83.8 | 84.9 | 3 |
| Example 18c | 806 | 85.7 | 83.9 | 4.5 |
| Example 19 | 807 | 85.6 | 80.5 | 3 |
| Example 20 | 806 | 85.6 | 80.9 | 3.5 |
| Example 21a | 809 | 85.6 | 84.1 | 3.2 |
| Example 21b | 805 | 85.1 | 85.9 | 3.9 |
| Example 22a | 815 | 85.8 | 83.6 | 3 |
| Example 22b | 795 | 84.7 | 85.9 | 4.2 |
| Comparative Example 1 | 809 | 75.5 | 85 | 3 |
| Comparative Example 2a | 815 | 85.1 | 79.6 | 3.5 |
| Comparative Example 2b | 790 | 85.3 | 86.1 | 3.2 |
| Comparative Example 3 | 835 | 73.4 | 75.3 | 8.3 |
| Comparative Example 4 | 807 | 80.5 | 83.8 | 3.7 |

As can be seen from Table 1, compared with the comparative examples, the batteries of the present disclosure have high energy density, excellent cycling stability, low-temperature discharge performance, and high-temperature storage performance.

The embodiments of the present disclosure have been described in detail above; however, the present disclosure is not limited thereto. Within the technical concept of the present disclosure, various simple modifications can be made to the technical solution of the present disclosure, including the combination of various technical features in any other suitable way. These simple modifications and combinations should also be regarded as the content disclosed by the present disclosure and all fall within the scope of protection of the present disclosure.

What is claimed is:

1. A lithium-ion secondary battery, wherein the lithium-ion secondary battery comprises a positive electrode plate, a negative electrode plate, and an electrolyte solution and has a charge cut-off voltage ≥4.5 V, wherein
the positive electrode plate comprises a positive electrode active coating layer comprising a positive electrode active material and a solid electrolyte, wherein the positive electrode active material comprises lithium cobaltate containing the element Al, and the mass content c1 of the element Al in the positive electrode active coating layer is 6800-15000 ppm; and the solid electrolyte comprises at least one of lithium aluminum titanium phosphorus oxide, lithium lanthanum zirconium tantalum oxide, and lithium lanthanum titanium oxide;
the negative electrode plate comprises a negative electrode active coating layer, and the negative electrode active coating layer comprises a negative electrode active material comprising a silicon-carbon material, wherein the mass content c2 of the element Si in the negative electrode active coating layer is 1.5-20%; and
the electrolyte solution comprises a solvent comprising a carboxylate compound;
wherein an outer surface of the negative electrode active coating layer has first recesses;
the depth of the first recesses is 5-40 μm;
the width of the first recesses is 40-200 μm; and
the spacing between the first recesses is 0.5-5 mm.

2. The lithium-ion secondary battery according to claim 1, wherein the mass content c1 of the element Al in the positive electrode active coating layer is 7100-10000 ppm;
and/or the mass content c2 of the element Si in the negative electrode active coating layer is 4-12%;
and/or the mass content of the carboxylate compound in the electrolyte solution is 10-80%;
and/or the carboxylate compound comprises at least one of the following solvents which are substituted with fluorine or unsubstituted: ethyl acetate, propyl acetate, n-butyl acetate, isobutyl acetate, n-amyl acetate, iso-amyl acetate, methyl propionate, ethyl propionate, propyl propionate, methyl butyrate, ethyl butyrate, and ethyl n-butyrate.

3. The lithium-ion secondary battery according to claim 1, wherein the solid electrolyte comprises a characteristic element including at least one of Ti, Zr, La, and Ta; and
the ratio of the mass content c3 of the characteristic element in the positive electrode active coating layer to the mass content c4 of the element Co in the positive electrode active coating layer is 0.001-0.0055.

4. The lithium-ion secondary battery according to claim 3, wherein the mass content c3 of the characteristic element in the positive electrode active coating layer is 600-3000 ppm.

5. The lithium-ion secondary battery according to claim 3, wherein the mass content c4 of the element Co in the positive electrode active coating layer is 400000-750000 ppm.

6. The lithium-ion secondary battery according to claim 3, wherein the average particle size of the solid electrolyte is 500 nm-3 μm.

7. The lithium-ion secondary battery according to claim 1, wherein the electrolyte solution further comprises vinylene carbonate; and
the mass content c5 of vinylene carbonate in the electrolyte solution is 0.01-15%.

8. The lithium-ion secondary battery according to claim 1, wherein the solid electrolyte comprises a characteristic element including at least one of Ti, Zr, La, and Ta; the mass content c3 of the characteristic element in the positive electrode active coating layer and the mass content c1 of the element Al in the positive electrode active coating layer satisfy: $5 \times 10^{-6} \leq c3 \times c1 \leq 2.5 \times 10^{-5}$.

9. The lithium-ion secondary battery according to claim 1, wherein the lithium-ion secondary battery further comprises a separator comprising an organic coating layer; the organic coating layer comprises polymer particles containing at least one of cyano, isocyano, isocyanate group, and triazinyl.

10. The lithium-ion secondary battery according to claim 9, wherein the polymer particles contain the element N, and the mass content of the element N in the organic coating layer is 10.5-55%.

11. The lithium-ion secondary battery according to claim 9, wherein the organic coating layer faces the positive electrode plate.

12. The lithium-ion secondary battery according to claim 9, wherein the polymer particles comprise at least one of polyacrylonitrile, nitrile butadiene rubber, 1,3,5-triazine-2,4,6-triamine, cyanuric acid, melamine, and melamine trithiocyanurate.

13. The lithium-ion secondary battery according to claim 9, wherein the thickness h of the organic coating layer is 0.5-4 μm.

14. The lithium-ion secondary battery according to claim 1, wherein the silicon-carbon material comprises primary spherical particles;
and/or the mass content of the element Si in the silicon-carbon material is 30-80%;
and/or the negative electrode active material further comprises a graphite material.

15. The lithium-ion secondary battery according to claim 1, wherein the positive electrode plate comprises a positive electrode current collector and the positive electrode active coating layer located on a surface on at least one side of the positive electrode current collector; the length of the positive electrode active coating layer located on a first surface of the positive electrode current collector is greater than the length of the positive electrode active coating layer located on a second surface of the positive electrode current collector; a region where a projection of the positive electrode active coating layer located on the first surface overlaps with a projection of the positive electrode active coating layer located on the second surface in the thickness direction of the positive electrode plate is a double-sided coating region, and a region where the projections do not overlap is a single-sided coating region;
a surface of the positive electrode active coating layer located on the first surface has second recesses, and a surface of the positive electrode active coating layer located on the second surface has protrusions;
the second recesses and the protrusions are located in the double-sided coating region.

16. The lithium-ion secondary battery according to claim 15, wherein the positive electrode plate comprises a positive electrode tab welding region, a pasting region, and an empty foil region, and the second recesses and the protrusions are located in the pasting region.

17. The lithium-ion secondary battery according to claim 15, wherein the depth of the second recesses is 3-40 μm, the width of the second recesses is 0.2-8 mm, and the spacing between the second recesses is 0.5-8 mm.

18. The lithium-ion secondary battery according to claim 15, wherein the height of the protrusions is 3-40 μm, the width of the protrusions is 0.2-8 mm, and the spacing between the protrusions is 0.5-8 mm.

19. The lithium-ion secondary battery according to claim 15, wherein the positive electrode plate comprises a positive electrode tab welding region, a pasting region, and an empty foil region, and the pasting region comprises the double-sided coating region and the single-sided coating region;
the distance from the second recesses to an edge of the positive electrode tab welding region is w1, with $0 \text{ mm} < w1 \leq 10 \text{ mm}$;
and/or the distance from the second recesses to an edge of a first side of the pasting region is w2, with $2 \text{ mm} \leq w2 \leq 40 \text{ mm}$, and the first side is a side where the positive electrode tab welding region is arranged;
and/or the distance from the second recesses to an edge of a second side of the pasting region is w3, with $2 \text{ mm} \leq w3 \leq 25 \text{ mm}$, and the second side is a side opposite to the side where the positive electrode tab welding region is arranged;
and/or the distance from the second recesses to an edge of a third side of the pasting region is w4, with $0 \text{ mm} < w4 < 20 \text{ mm}$, and the third side is a side of the pasting region close to a winding head end;
and/or the distance from the second recesses to a boundary line between the double-sided coating region and the single-sided coating region is w5, with $0 \text{ mm} < w5 \leq 20 \text{ mm}$.

\* \* \* \* \*